US012317111B2

United States Patent
Cao

(10) Patent No.: US 12,317,111 B2
(45) Date of Patent: *May 27, 2025

(54) ELECTRONIC DEVICE AND METHOD FOR WIRELESS COMMUNICATION, AND COMPUTER-READABLE STORAGE MEDIUM

(71) Applicant: Sony Group Corporation, Tokyo (JP)

(72) Inventor: Jianfei Cao, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/636,515

(22) Filed: Apr. 16, 2024

(65) Prior Publication Data
US 2024/0267771 A1    Aug. 8, 2024

Related U.S. Application Data

(63) Continuation of application No. 17/272,674, filed as application No. PCT/CN2019/104522 on Sep. 5, 2019, now Pat. No. 11,991,542.

(30) Foreign Application Priority Data

Sep. 12, 2018 (CN) .......................... 201811061539.2

(51) Int. Cl.
*H04W 4/00* (2018.01)
*H04L 5/00* (2006.01)
(Continued)

(52) U.S. Cl.
CPC ........... *H04W 24/08* (2013.01); *H04L 5/0048* (2013.01); *H04W 24/10* (2013.01); *H04W 72/541* (2023.01)

(58) Field of Classification Search
None
See application file for complete search history.

(56) References Cited

U.S. PATENT DOCUMENTS 5,491,833 A    2/1996  Hamabe
7,403,748 B1   7/2008  Keskitalo et al.
(Continued)

FOREIGN PATENT DOCUMENTS

CN    103974316 A    8/2014
CN    106797649 A    5/2017
(Continued)

OTHER PUBLICATIONS

International Search Report and Written Opinion mailed on Nov. 27, 2019, received for PCT Application No. PCT/CN2019/104522 Filed on Sep. 5, 2019, 8 pages including English Translation.

*Primary Examiner* — Bob A Phunkulh
(74) *Attorney, Agent, or Firm* — XSENSUS LLP

(57) ABSTRACT

Provided are an electronic device and method for wireless communication, and a computer-readable storage medium. The electronic device comprises: a processing circuit configured to determine a resource, which is expected to be used for interference beam measurement and which is used for sending a reference signal, of a neighbor cell, wherein the interference beam measurement is used for measuring the degree of interference of a transmitted beam of the neighbor cell in a serving cell; report a resource indicator of the determined resource to a base station of the serving cell; and execute interference beam measurement on the basis of configuration information from the base station.

18 Claims, 16 Drawing Sheets

(51) Int. Cl.
*H04W 24/08* (2009.01)
*H04W 24/10* (2009.01)
*H04W 72/541* (2023.01)

(56) References Cited

U.S. PATENT DOCUMENTS

| | | |
|---|---|---|
| 9,900,789 B2 * | 2/2018 | Park .................. H04W 48/16 |
| 10,848,205 B2 * | 11/2020 | Kim ........................ H04B 7/08 |
| 11,088,751 B2 | 8/2021 | Davydov et al. |
| 2004/0097189 A1 | 5/2004 | Bongfeldt et al. |
| 2009/0196203 A1 | 8/2009 | Taira et al. |
| 2010/0279619 A1 | 11/2010 | Yeh et al. |
| 2010/0330922 A1 | 12/2010 | Li et al. |
| 2011/0014909 A1 | 1/2011 | Han et al. |
| 2011/0319092 A1 | 12/2011 | Kim et al. |
| 2012/0155341 A1 | 6/2012 | Yamamoto et al. |
| 2014/0161059 A1 | 6/2014 | Lee et al. |
| 2015/0117362 A1 * | 4/2015 | Luo ..................... H04W 72/121 370/329 |
| 2016/0182198 A1 | 6/2016 | Won et al. |
| 2016/0269087 A1 * | 9/2016 | Subramanian ......... H04B 7/024 |
| 2016/0269160 A1 | 9/2016 | Noh et al. |
| 2016/0301505 A1 | 10/2016 | Furuskog et al. |
| 2016/0345168 A1 | 11/2016 | Zhou et al. |
| 2016/0345228 A1 | 11/2016 | Liu et al. |
| 2017/0006613 A1 | 1/2017 | Kakishima et al. |
| 2017/0078065 A1 | 3/2017 | Nam et al. |
| 2017/0093038 A1 | 3/2017 | Li et al. |
| 2018/0097548 A1 | 4/2018 | Kim et al. |
| 2018/0227100 A1 | 8/2018 | Tong |
| 2018/0254863 A1 | 9/2018 | Choi et al. |
| 2018/0287680 A1 * | 10/2018 | Xu ....................... H04B 17/309 |
| 2019/0058523 A1 | 2/2019 | Wu et al. |
| 2019/0165848 A1 | 5/2019 | Han et al. |
| 2019/0166505 A1 * | 5/2019 | Zhao .................... H04W 16/18 |
| 2019/0238282 A1 | 8/2019 | Cao |
| 2019/0305842 A1 | 10/2019 | Ginesi et al. |
| 2019/0334691 A1 * | 10/2019 | Bendlin ................ H04L 5/1469 |
| 2019/0372633 A1 | 12/2019 | Chang et al. |
| 2020/0022010 A1 | 1/2020 | Kim et al. |
| 2020/0045572 A1 | 2/2020 | Yum et al. |
| 2020/0145079 A1 * | 5/2020 | Marinier ........... H04B 7/06966 |
| 2020/0145153 A1 | 5/2020 | Ma et al. |
| 2020/0213917 A1 * | 7/2020 | Liu .................. H04W 36/0061 |
| 2020/0228182 A1 * | 7/2020 | Nilsson ................ H04B 7/0647 |
| 2020/0236729 A1 | 7/2020 | Ahn et al. |
| 2020/0305088 A1 * | 9/2020 | Nory .................... H04B 7/0626 |
| 2020/0374731 A1 | 11/2020 | Hapsari et al. |

FOREIGN PATENT DOCUMENTS

| | | |
|---|---|---|
| CN | 107404764 A | 11/2017 |
| CN | 108028742 A | 5/2018 |
| CN | 108111247 A | 6/2018 |
| CN | 108337065 A | 7/2018 |
| CN | 108401264 A | 8/2018 |
| EP | 2663130 A1 | 11/2013 |
| WO | 2016/056970 A1 | 4/2016 |
| WO | 2017/204737 A1 | 11/2017 |
| WO | 2018/059478 A1 | 4/2018 |

* cited by examiner

| Reported value | Measured value | Unit |
|---|---|---|
| RSRQ_-30 | RSRQ -34 | dB |
| RSRQ_-29 | - 34 RSRQ < -33.5 | dB |
| ... | ... | ... |
| RSRQ_-02 | - 20.5 RSRQ < -20 | dB |
| RSRQ_-01 | - 20 RSRQ < -19.5 | dB |
| RSRQ_00 | RSRQ -19.5 | dB |
| RSRQ_01 | - 19.5 RSRQ < -19 | dB |
| RSRQ_02 | - 19 RSRQ < -18.5 | dB |
| ... | ... | ... |
| RSRQ_32 | - 4 RSRQ < -3.5 | dB |
| RSRQ_33 | - 3.5 RSRQ < -3 | dB |
| RSRQ_34 | - 3 RSRQ | dB |
| RSRQ_35 | - 3 RSRQ < -2.5 | dB |
| RSRQ_36 | - 2.5 RSRQ < -2 | dB |
| ... | ... | ... |
| RSRQ_45 | 2 RSRQ < 2.5 | dB |
| RSRQ_46 | 2.5 RSRQ | dB |

FIG. 5

| CSI report number | CSI Field |
|---|---|
| CSI report #n | CRI # 1, if reported |
| | CRI # 2, if reported |
| | CRI # 3, if reported |
| | CRI # 4, if reported |
| | RSRQ #1, if reported |
| | Differential RSRQ #2, if reported |
| | Differential RSRQ #3, if reported |
| | Differential RSRQ #4, if reported |

FIG. 6

| CSI report number | CSI Field |
|---|---|
| CSI report #n | CRI # 1, if reported |
| | CRI # 2, if reported |
| | CRI # 3, if reported |
| | CRI # 4, if reported |
| | 2 or less bits indicating a position of a maximum L1-RSRP |
| | Differential RSRP #1, if reported |
| | RSRP #2, if reported |
| | Differential RSRP #3, if reported |
| | Differential RSRP #4, if reported |

FIG. 7

| Reported value | Measured value | Unit |
|---|---|---|
| CSI_RSRP_00 | CSI_RSRP -140 | dBm |
| CSI_RSRP _01 | - 140 CSI_RSRP < -139 | dBm |
| CSI_RSRP _02 | - 139 CSI_RSRP < -138 | dBm |
| ... | ... | ... |
| CSI_RSRP _95 | - 46 CSI_RSRP < -45 | dBm |
| CSI_RSRP _96 | - 45 CSI_RSRP < -44 | dBm |
| CSI_RSRP _97 | - 44 CSI_RSRP | dBm |

FIG. 8

| CSI report number | CSI Field |
|---|---|
| CSI report #n | CRI # 1, if reported |
| | CRI # 2, if reported |
| | CRI # 3, if reported |
| | CRI # 4, if reported |
| | 2 or less bits indicating a Serial number of CRI#1 |
| | 2 or less bits indicating a Serial number of CRI#2 |
| | 2 or less bits indicating a Serial number of CRI#3 |
| | 2 or less bits indicating a Serial number of CRI#4 |
| | RSRP #1, if reported |
| | Differential RSRP #2, if reported |
| | Differential RSRP #3, if reported |
| | Differential RSRP #4, if reported |

FIG. 9

| CSI report number | CSI Field |
|---|---|
| CSI report #n | CRI # 1, if reported |
| | CRI # 2, if reported |
| | CRI # 3, if reported |
| | CRI # 4, if reported |
| | 2 or less bits indicating a position of a maximum RSRQ |
| | Differential RSRQ #1, if reported |
| | RSRQ #2, if reported |
| | Differential RSRQ #3, if reported |
| | Differential RSRQ #4, if reported |
| | RSRP #1, if reported |
| | Differential RSRP #2, if reported |
| | Differential RSRP #3, if reported |
| | Differential RSRP #4, if reported |

FIG. 10

| CSI report number | CSI Field |
|---|---|
| CSI report #n | PCI |
| | Strong interferences CRI #1, if reported |
| | PCI |
| | Strong interferences CRI #2, if reported |
| | PCI |
| | Strong interferences CRI #3, if reported |
| | PCI |
| | Strong interferences CRI #4, if reported |
| | *2 or less bits indicating a position of a maximum L1-RSRP* |
| | RSRP #1, if reported |
| | Differential RSRP #2, if reported |
| | Differential RSRP #3, if reported |
| | Differential RSRP #4, if reported |

FIG. 11

| CSI report number | CSI Field |
|---|---|
| CSI report #n | PCI |
| | Weak interferences CRI #1, if reported |
| | PCI |
| | Weak interferences CRI #2, if reported |
| | PCI |
| | Weak interferences CRI #3, if reported |
| | PCI |
| | Weak interferences CRI #4, if reported |
| | *2 or less bits indicating a position of a maximum L1-RSRP* |
| | RSRP #1, if reported |
| | Differential RSRP #2, if reported |
| | Differential RSRP #3, if reported |
| | Differential RSRP #4, if reported |

FIG. 12

ELECTRONIC DEVICE AND METHOD FOR WIRELESS COMMUNICATION, AND COMPUTER-READABLE STORAGE MEDIUM

CROSS-REFERENCE TO RELATED APPLICATIONS

The present application is a continuation of U.S. application Ser. No. 17/272,674, filed Mar. 2, 2021, which is based on PCT filing PCT/CN2019/104522, filed Sep. 5, 2019, which claims priority to Chinese Patent Application No. 201811061539.2, titled "ELECTRONIC DEVICE AND METHOD FOR WIRELESS COMMUNICATION, AND COMPUTER-READABLE STORAGE MEDIUM", filed on Sep. 12, 2018 with the China National Intellectual Property Administration, each of which is incorporated herein by reference in its entirety.

FIELD

The present disclosure relates to the technical field of wireless communications, in particular to interference measurement in a wireless communication system, and in more particular to an electronic apparatus and a method for wireless communications and a computer-readable storage medium.

BACKGROUND

New Radio (NR), as a next-generation radio access method for Long Term Evolution (LTE), is a radio access technology (RAT) different from LTE. In the current 5G standard, mechanism in the aspect of beam management is enhanced, which may include enhancements relevant to interference measurement.

For example, user equipment (UE) measures physical layer reference signal received power (L1-Reference Signal Received Power, L1-RSRP) and reports a measurement result to a base station, so that the base station can select a transmitting beam with higher L1-RSRP to communicate with the UE. However, the L1-RSRP cannot reflect an impact produced by an interference beam from a neighboring cell. In other words, a beam with higher L1-RSRP may be subjected to stronger interferences from the neighboring cell, resulting in poor beam quality.

In addition, high-level interference measurement mechanism for mobility management has a long period of measurement and reporting, and is not suitable for beam management based on interference sensing.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

An electronic apparatus for wireless communications is provided according to an aspect of the present disclosure. The electronic apparatus includes processing circuitry, which is configured to: determine resources of a neighboring cell for transmitting a reference signal which are desired to be used for interference beam measurement, where the interference beam measurement is used to measure a degree of interferences produced by a transmitting beam of the neighboring cell to a serving cell; report a resource indicator of the determined resources to a base station of the serving cell; and execute the interference beam measurement based on configuration information from the base station.

A method for wireless communications is provided according to an aspect of the present disclosure. The method includes: determining resources of a neighboring cell for transmitting a reference signal which are desired to be used for interference beam measurement, where the interference beam measurement is used to measure a degree of interferences produced by a transmitting beam of the neighboring cell to a serving cell; reporting a resource indicator of the determined resources to a base station of the serving cell; and executing the interference beam measurement based on configuration information from the base station.

An electronic apparatus for wireless communications is provided according to another aspect of the present disclosure. The electronic apparatus includes processing circuitry, which is configured to: acquire an indicator of resources to be measured from user equipment of a serving cell, where the indicator of resources to be measured indicates resources of a neighboring cell for transmitting a reference signal which are desired to be used for interference beam measurement, and the interference beam measurement is used to measure a degree of interferences produced by a transmitting beam of the neighboring cell to the serving cell; provide the indicator of resources to be measured to a base station of the neighboring cell; and generate configuration information for the interference beam measurement to be provided to the user equipment.

A method for wireless communications is provided according to another aspect of the present disclosure. The method includes: acquiring an indicator of resources to be measured from user equipment of a serving cell, where the indicator of resources to be measured indicates resources of a neighboring cell for transmitting a reference signal which are desired to be used for interference beam measurement, and the interference beam measurement is used to measure a degree of interferences produced by a transmitting beam of the neighboring cell to the serving cell; providing the indicator of resources to be measured to a base station of the neighboring cell; and generating configuration information for the interference beam measurement to be provided to the user equipment.

According to other aspects of the present disclosure, there are further provided computer program codes and computer program products for implementing the methods for wireless communications above, and a computer readable storage medium having recorded thereon the computer program codes for implementing the methods for wireless communications described above.

With the electronic apparatus and method according to the present disclosure, a degree of interferences produced by a transmitting beam of the neighboring cell to a serving cell is measured by executing the interference beam measurement, so that beam quality of each beam of the serving cell can be more accurately evaluated in the case of taking the interferences into consideration, thereby achieving more efficient beam management.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings:

FIG. 5 shows an example of quantizing physical layer reference signal receiving quality (L1-RSRQ);

FIG. 6 shows a schematic example of a measurement result reported in a case that a reference signal is a channel state information reference signal (CSI-RS);

FIG. 7 shows another schematic example of the measurement result reported in the case that the reference signal is CSI-RS;

FIG. 8 shows an example of quantizing the L1-RSRP;

FIG. 9 shows another schematic example of the measurement result reported in the case that the reference signal is CSI-RS;

FIG. 10 shows another schematic example of the measurement result reported in the case that the reference signal is CSI-RS;

FIG. 11 shows another schematic example of the measurement result reported in the case that the reference signal is CSI-RS;

FIG. 12 shows another schematic example of the measurement result reported in the case that the reference signal is CSI-RS;

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
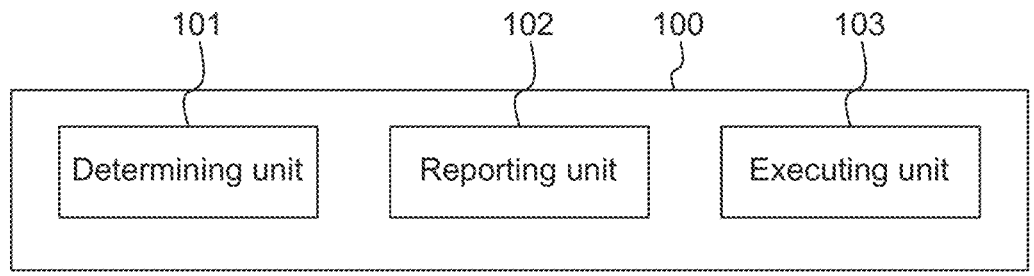
FIG. 1 is a block diagram showing functional modules of an electronic apparatus for wireless communications according to an embodiment of the present disclosure.

FIG. 1 is a block diagram showing functional modules of an electronic apparatus 100 for wireless communications according to an embodiment of the present disclosure. The electronic apparatus 100 includes a determining unit 101, a reporting unit 102, and an executing unit 103. The determining unit 101 is configured to determine resources of a neighboring cell for transmitting a reference signal which are desired to be used for interference beam measurement. The interference beam measurement is used to measure a degree of interferences produced by a transmitting beam of the neighboring cell to a serving cell. The reporting unit 102 is configured to report a resource indicator of the determined resources to a base station of the serving cell. The executing unit 103 is configured to execute the interference beam measurement based on configuration information from the base station.

The determining unit 101, the reporting unit 102, and the executing unit 103 may be implemented by one or more processing circuitries. The processing circuitry may be implemented as, for example, a chip. In addition, it should be understood that various functional units in the apparatus shown in FIG. 1 are logical modules divided based on functions implemented by these functional units, and are not intended to limit the specific implementations, which is also applicable to examples of other electronic apparatus described subsequently.

The electronic apparatus 100 may be arranged at a side of user equipment (UE) or may be communicatively connected to UE. Here it should be further pointed out that the electronic apparatus 100 may be implemented at a chip level or an apparatus level. For example, the electronic apparatus 100 may operate as the user equipment itself and further include external apparatus such as a memory, a transceiver and the like (which are not shown in the Figures). The memory may be configured to store programs to be executed and related data information for the user equipment to implement various functions. The transceiver may include one or more communication interfaces to support communications with various apparatus (for example, a base station, other user equipment and the like). Specific implementations of the transceiver are not limited herein, which is also applicable to examples of other electronic apparatuses at the side of the user equipment described subsequently.

As described above, it is desired to acquire a degree of interferences produced by the transmitting beam of the neighboring cell to the serving cell with a lower latency, so as to achieve beam management in the case of taking interferences from the neighboring cell into consideration. In the present disclosure, the serving cell refers to a cell into which the UE currently accesses, and the neighboring cell refers to a cell adjacent to the serving cell. The transmitting beam of the neighboring cell may produce interferences to communication of the serving cell. For example, in a case that the base station of the serving cell transmits data to the UE using a transmitting beam beam1, a transmitting beam beam2 of the base station of the neighboring cell may be received by the UE simultaneously, resulting in interferences and thereby reducing communication quality.

Therefore, by causing the neighboring cell to transmit the reference signal in a desired beam transmitting direction, and causing the UE of the serving cell to measure the reference signal, the degree of interferences of the transmitting beam of the neighboring cell to the serving cell can be acquired. The reference signal described herein may be, for example, a synchronization signal (SS) (or called a synchronization signal/physical broadcast channel (SS/PBCH)), or a CSI-RS (channel state information reference signal).

It should be understood that in a case of adopting beamforming technology, the base station may have multiple beam transmitting directions, and each beam transmitting direction has a predetermined correspondence with resources for transmitting the reference signal. Considering factors such as a spatial location, among all transmitting beams of the neighboring cell, there may be only a part which produces interferences to the serving cell. Therefore, it is possible to only take this part of transmitting beams into consideration so as to reduce a measurement load.

In this embodiment, the determining unit 101 determines resources of the neighboring cell for transmitting the reference signal which are to be used for interference beam measurement, that is, determines a direction of the transmitting beam of the neighboring cell. In an example, the determining unit 101 is configured to determine the resources based on information collected at the time of initial access and/or configuration relevant to mobility. Specifically, at the time of initial access, the UE measures synchronization signals/physical broadcast channels (SS/PBCH) from multiple cells and selects one (that is, the serving cell) with the best channel quality to access into. Accordingly, the UE regards other cells that do not serve the UE as cells that may produce interferences (also referred to as interfering cells), and may store beam relevant information or resource indicator information of each interfering cell, for example. The determining unit 101 may select, based on the information, directions of one or more transmitting beams in which the neighboring cell is most likely to produce interferences to the serving cell, that is, determine corresponding resources for transmitting the reference signal. The reporting unit 102 reports a resource indicator of the determined resources to the base station of the serving cell, and the base station of the serving cell transmits the resource indicator to the base station of the neighboring cell via Xn signaling for example, so that the base station of the neighboring cell reach a consensus with the base station of the serving cell and use corresponding resources to transmit dedicated reference signals (such as CSI-RS) for the UE of the serving cell to execute measurement.

Accordingly, the executing unit 103 performs interference beam measurement based on configuration information from the base station. It can be understood that the configuration information is used to configure a specific manner used in interference beam measurement, occupied resources by the measurement and so on. For example, the executing unit 103 may receive the configuration information via radio resource control (RRC) signaling. After the executing unit 103 completes the interference beam measurement, the reporting unit 102 reports a measurement result of the interference beam measurement to the base station. In this way, the UE only measures one or more beams of the neighboring cell that are most likely to produce interferences to the UE, thereby saving energy consumption. Further, the base station of the neighboring cell is not required to occupy too many recourses to transmit interference beams for measurement performed by a non-serving user, thereby reducing resource overhead of the reference signal.

Figure 2:
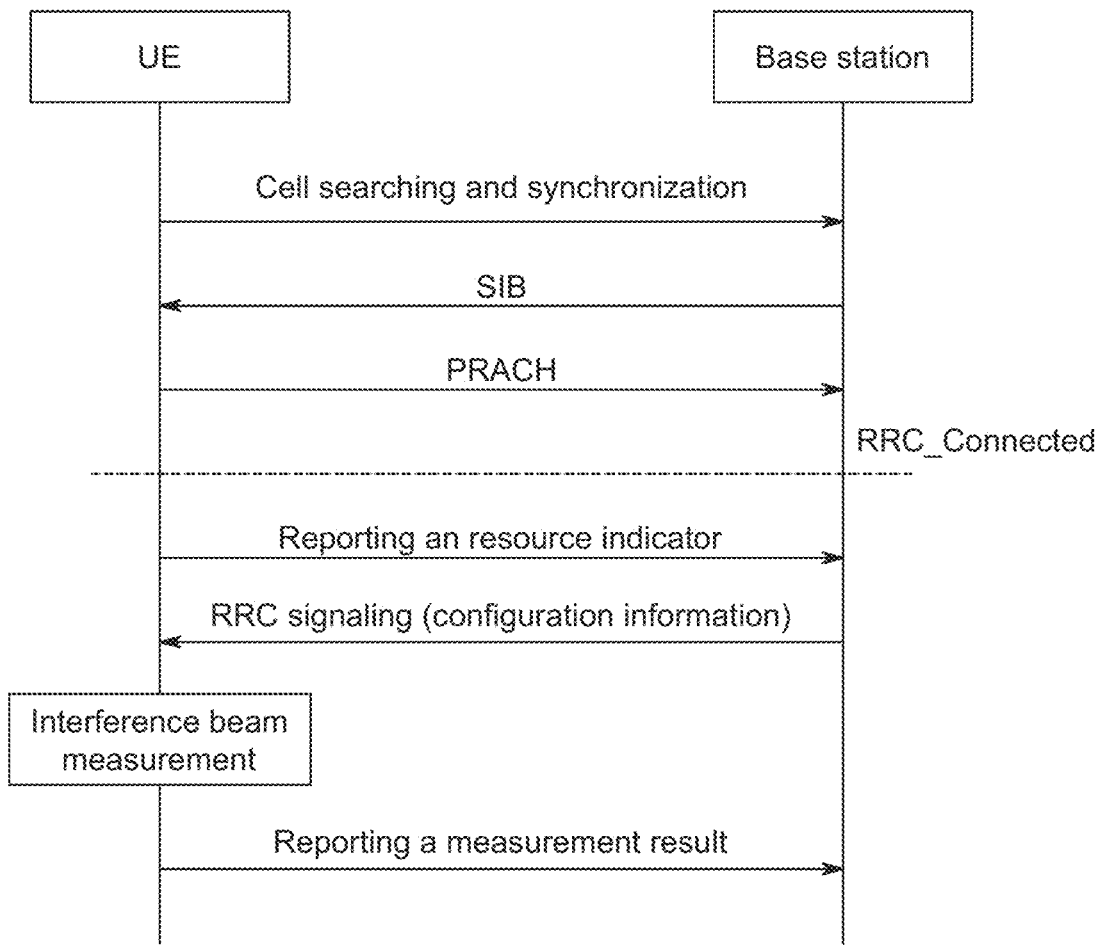
FIG. 2 shows related information procedure between a base station of a serving cell and UE.

For case of understanding, FIG. 2 shows related information procedure between a base station of a serving cell and UE. As shown in FIG. 2, in an initial access phase, the UE searches for and synchronizes to the current serving cell, receives the system information block (SIB) from the base station of the serving cell in a downlink, and selects the current serving cell and transmits a physical random access channel (PRACH) to the base station in an uplink. In an initial process of cell searching and selecting, the UE searches for each carrier in turn and determines a cell with the strongest synchronization signal receiving strength as the serving cell. In this process, the UE records and stores cell IDs of cells corresponding to observed stronger carriers and the indicators of beams. After successfully accessing into the cell, the UE enters into an RRC_Connected state. Next, the UE reports to the base station a resource indicator of resources of the neighboring cell that the UE desires to measure. For example, the UE reports a previously stored cell ID of the neighboring cell and an indicator of its beam to the base station. The base station transmits the configuration information for interference beam measurement to the UE. The UE executes interference beam measurement based on the configuration information, and reports the measurement result to the base station, so that the base station can use the measurement result to execute beam management. In this embodiment, the UE executes interference measurement and reporting in a physical layer.

For example, the configuration information may include one or more of the following: resources of the serving cell for the interference beam measurement; resources of the neighboring cell for transmitting the reference signal; periodicity configuration relevant to the interference beam measurement; a sweeping scheme of an interference beam; and a category of the reference signal. It should be noted that that the configuration information may be included in one piece of signaling (such as RRC signaling) or multiple pieces of signaling (such as a combination of RRC signaling and MAC signaling).

In another example, after completing access and communicating with the serving base station, the UE performs high-level measurement relevant to mobility based on configuration of a serving base station. For example, the UE measures signal strength of the neighboring cell, and compares the signal strength of the neighboring cell with signal strength of the serving cell for use by the base station to determine whether to perform handover to another cell for service. In this process, the UE is required to measure multiple frequencies of the neighboring cell configured by the base station, so as to store the cell ID and the beam of the cell corresponding to the measured stronger frequency as historical information, to be used for screening and reporting an interference beam to be measured by the serving base station.

As described above, the reference signal may be the SS/PBCH or CSI-RS. A width of a beam for the SS/PBCH is relatively wide, and up to 64 SS/PBCH resources can cover an entire cell. Therefore, in the case of using SS/PBCH, an overall understanding of the interferences produced by the neighboring cell can be acquired. On the other hand, a width of a beam for the CSI-RS is relatively narrow. Therefore, in the case of using CSI-RS, the interferences produced by the neighboring cell can be learned more accurately.

To measure the interference beam of the neighboring cell, the serving cell is required to configure measurement resources for the UE in advance. The measurement resources may include SS/PBCH resources or NZP CSI-RS (Non-Zero Power CSI-RS) resources of the neighboring cell used for the transmitting beam, and may also include SS/PBCH resources or NZP CSI-RS resources of the serving cell used for L1-RSRP measurement. In a case that resources used by the neighboring cell for transmitting the reference signal are the same as resources of the neighboring cell used for transmitting the reference signal for interference beam measurement reported by the reporting unit 102, this item may not be included in the configuration information.

In addition, the periodicity configuration relevant to the interference beam measurement may include one or more of the following: periodical measurement, aperiodic measurement, and semi-persistent measurement. The interference beam measurement may be executed periodically or aperiodically, for example, executed when the communication quality drops to a predetermined level. The interference beam measurement may be executed in a semi-persistent manner. For example, the base station dynamically triggers the interference beam measurement through downlink control information (DCI). It should be understood that the above three kinds of periodicity configuration may be used in combination.

The sweeping scheme of the interference beam may include one of the following: the base station of the neighboring cell sweeps the transmitting beam, and UE of the serving cell sweeps a receiving beam (hereinafter referred to as a P1' process); the base station of the neighboring cell sweeps the transmitting beam, and UE of the serving cell fixes the receiving beam (hereinafter referred to as a P2' process); and the base station of the neighboring cell fixes the transmitting beam, and UE of the serving cell sweeps a receiving beam (hereinafter referred to as a P3' process).

Figure 3A:
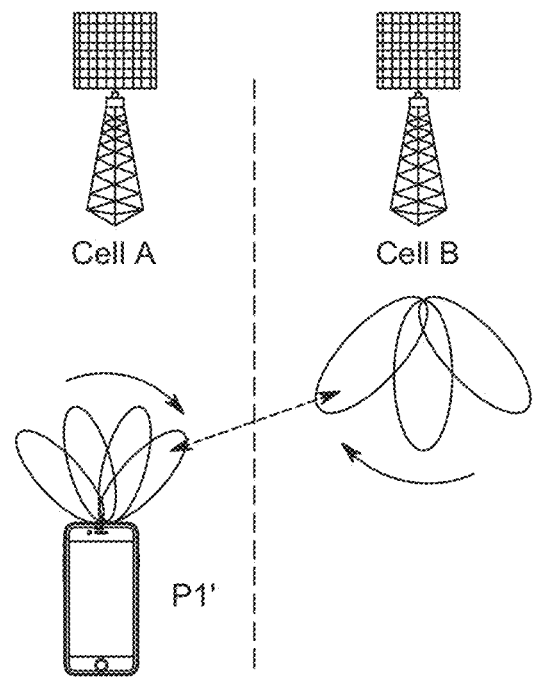
FIGS. 3A to 3C are schematic diagrams showing three sweeping schemes for an interference beam, respectively.
Figure 3B:
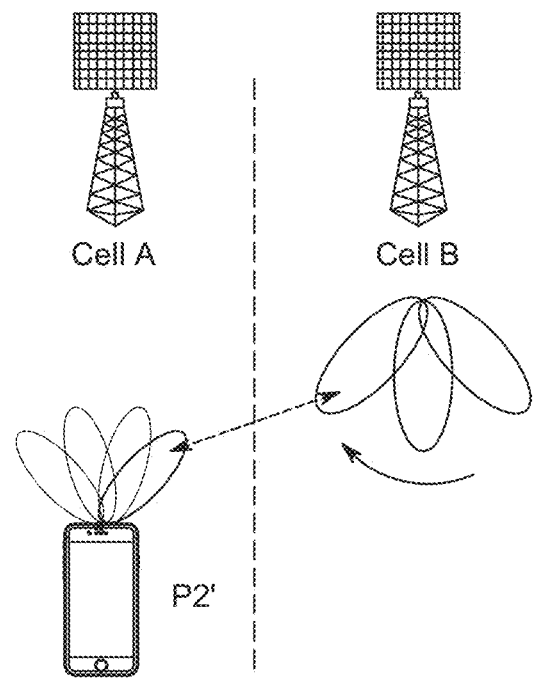
Figure 3C:
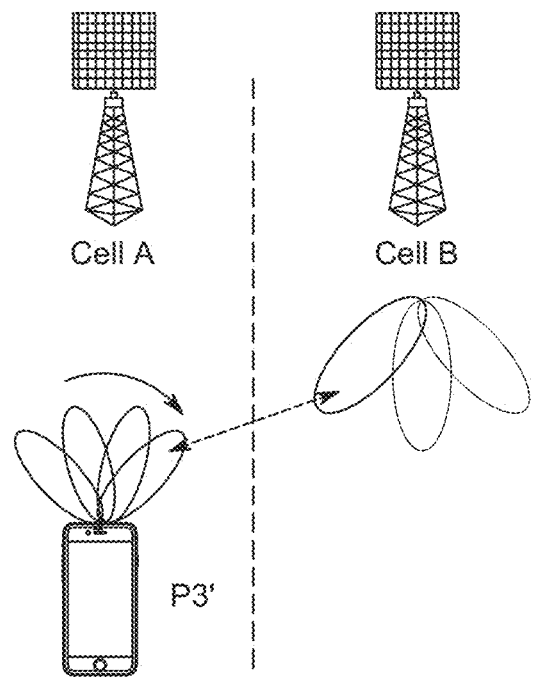

For ease of understanding, FIG. 3A shows an example of the P1' process. FIG. 3B shows an example of the P2' process. FIG. 3C shows an example of the P3' process. In FIGS. 3A to 3C, a cell A is a serving cell, a cell B is a neighboring cell, and a beam represented by a solid black line is a transmitting beam or a receiving beam involved in measurement. It should be noted that the transmitting beams of the neighboring cell represented by solid black lines in FIG. 3A and the transmitting beams of the neighboring cell represented by solid gray lines in FIGS. 3B to 3C may only be a part rather than all of transmitting beams that the neighboring cell can use. Similarly, the receiving beams of the UE shown in the drawings may be only a part of the receiving beam that the UE can use. In addition, although only one neighboring cell is shown in FIGS. 3A to 3C, and it is not restrictive. There may be multiple neighboring cells.

In the case that the reference signal is the SS/PBCH, the resource indicator is a synchronization signal block resource indicator (SSBRI). Due to the periodical transmission property of the SS/PBCH, the following configuration can be adopted: periodic interference beam measurement is executed, and/or the P1' process is adopted. In the case that the reference signal is the CSI-RS, the resource indicator is a channel state information reference signal resource indicator (CSI-RS Resource Indicator, CRI). In order to reduce a load for the neighboring cell to transmit the reference signal, the following configuration can be adopted: aperiodic interference beam measurement is executed, and/or the P2' process or the P3' process may be adopted. It should be understood that these configurations are only illustrative rather than restrictive.

In the case that the reference signal is the CSI-RS, the executing unit 103 may further be configured to determine the sweeping scheme of the interference beam based on a specific parameter in the RRC signaling. For example, the specific parameter is InterferenceMeasureRSRepetition. In a case that the specific parameter is set to ON, it means that the reference signal is repeatedly transmitted, and the sweeping scheme of the interference beam is that the base station of the neighboring cell fixes the transmitting beam, and user equipment of the serving cell sweeps a receiving beam, that is, the P3' process. In a case that the specific parameter is set to OFF, it means that the reference signal is not repeatedly transmitted, and the sweeping scheme of the interference beam is that the base station of the neighboring cell sweeps the transmitting beam, and user equipment of the serving cell fixes a receiving beam, that is, the P2' process. In addition, in a case that the specific parameter is not configured, it may be considered that the CSI-RS resources are not used for interference beam measurement.

For example, the executing unit 103 is configured to: with respect to each pair of beams of the serving cell for transceiving the reference signal, measure an L1-RSRP; with respect to each pair of beams formed by the transmitting beam of the base station of the neighboring cell and a receiving beam of the user equipment of the serving cell, which is used for the interference beam measurement, measure a physical layer received signal strength indication (L1-RSSI), or measure a sum of interferences and noise on resources elements carrying the reference signal; and calculate, based on the measured L1-RSRP and L1-RSSI, physical layer reference signal receiving quality (L1-RSRQ) of each pair of beams of the serving cell in a case of taking interferences from the neighboring cell into consideration, or calculate, based on the measured L1-RSRP and the sum of the interferences and noise, a physical layer signal to interference and noise ratio (L1-SINR) of each pair of beams of the serving cell in a case of taking the interferences from the neighboring cell into consideration. Hereinafter, L1-RSRQ and L1-SINR may be referred to as RSRQ and SINR for short, respectively.

Figure 4:
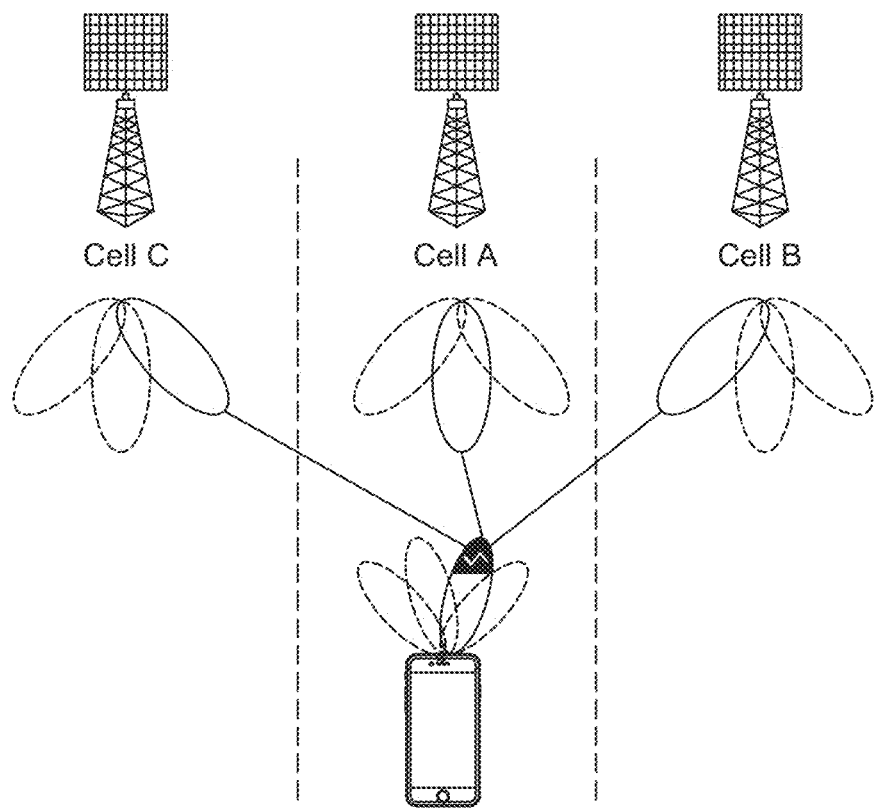
FIG. 4 is a schematic diagram showing interference beam measurement.

The L1-RSRP of the pair of beams of the serving cell for transceiving the reference signal is measured. For the same receiving beam, the L1-RSSI or the sum of interferences and noise (I+N) of the interference beam of the neighboring cell is measured. The ratio of the two (that is, L1-RSRP/L1-RSSI or L1-RSRP/(I+N)) is calculated. Thus, the beam quality of this pair of beams in the case of taking interferences from the neighboring cell into consideration, that is, the L1-RSRQ or L1-SINR, can be acquired. FIG. 4 shows a schematic diagram of the measurement. In FIG. 4, beams represented by solid black lines represent a transmitting beam and a receiving beam, a cell A is a serving cell, and cells B and C are neighboring cells. It should be understood that the number of neighboring cells is not limited to two shown in FIG. 4.

In a case of sweeping multiple interference beams of neighboring cells with respect to one receiving beam, for example, sweeping the three beams of neighboring cells B and C in FIG. 4, multiple L1-RSRQs or L1-SINRs may be acquired. For example, a maximum or minimum value among the multiple L1-RSRQs or L1-SINRs may be kept as needed.

In an example, the executing unit 103 may further determine, based on the calculated L1-RSRQs or L1-SINRs, N pairs of beams of the serving cell with maximum L1-RSRQ or L1-SINR, as N pairs of beams with the best beam quality in the case of taking interferences from the neighboring cell into consideration. The reporting unit 102 reports resource indicators of resources of the reference signals corresponding to transmitting beams in the N pairs of beams to the base station as the measurement result, where N is a natural number. In this way, the base station can acquire a transmitting beam that is less interfered by the neighboring cells. In a case that the reference signal of SS/PBCH is adopted, the SSBRI is reported. In the case that the reference signal CSI-RS is adopted, the CRI is reported. For example, N may be equal to 4.

In addition, the reported measurement result may further include an indication of beam quality relevant to the N pairs of beams.

For example, the indication of beam quality includes a quantized value of L1-RSRQ or L1-SINR relevant to each pair of beams among the N pairs of beams. FIG. 5 shows an example of quantizing the RSRQ. A quantized value of the RSRQ ranges from −34 dB to 2.5 dB with a step size of 0.5 dB. Therefore, there are 77 quantized states in total, and each reported RSRQ may be represented by a field of 7 bits. In addition, the SINR may be quantized similarly.

FIG. 6 shows a schematic example of the reported measurement result in a case that the reference signal is the CSI-RS. In FIG. 6, a CSI field includes four CRIs and quantized values of RSRQs respectively corresponding to the four CRIs. CRI #1 to CRI #4 and RSRQ #1 to RSRQ #4 are in one to one correspondence. RSRQs respectively corresponding to CRI #1 to CRI #4 are ranked, for example, in a descending order, that is, the RSRQ #1 corresponding to CRI #1 is the maximum.

Also, CRIs may be ranked with SINR as an index, and SINRs corresponding to the first four CRIs are reported. In addition, in the case that the reference signal is the SS/PBCH, the SSBRI is used in place of the CRI.

It should be noted that in FIG. 6, except the value of the RSRQ corresponding to the first CRI which is represented by an actual quantized value, the rest of the RSRQs are all represented in differential values to reduce signaling overhead. In other words, the executing unit 103 is further configured to use, by taking the maximum L1-RSRQ or L1-SINR as a reference, a differential value of L1-RSRQ or L1-SINR relevant to another pair of beams among the N pairs of beams relative to the reference as an indication of the beam quality of the other pair of beams.

In addition to the quantized value of the L1-RSRQ or L1-SINR, the indication of beam quality may further include an indication of whether the L1-RSRP of each pair of beams among the N pairs of beams is above a predetermined threshold or an indication of a range within which the L1-RSRP of each pair of beams among the N pairs of beams falls. As such, for example, a transmitting beam with a high L1-RSRQ or L1-SINR but a low L1-RSRP can be indicated.

In a case that the indication of beam quality includes the indication of whether the L1-RSRP of each pair of beams among the N pairs of beams is above a predetermined threshold, the indication of beam quality may be represented by an additional field of 1 bit, for example. In addition, a possible range of the value of the L1-RSRP may be divided into several ranges, and the number of bits to be used may be determined based on the number of divided ranges. For example, the possible range of the L1-RSRP is divided into 4 ranges, and 2 additional bits are used to indicate the range within which the L1-RSRP falls. The one or two additional bits herein may be added after the quantized value of the RSRQ or SINR, for example.

In another example, the indication of beam quality includes a quantized value of the L1-RSRP of each pair of beams among the N pairs of beams. The indication of beam quality may further include a quantized value of the L1-RSRQ or L1-SINR relevant to each pair of beams among the N pairs of beams or may not include the quantized value of the L1-RSRQ or L1-SINR.

In order to reduce the signaling overhead, a maximum L1-RSRP may be used as a reference, and a differential value of another L1-RSRP relative to the reference may be used as the quantized value of the L1-RSRP of another pair of beams. The indication of beam quality further includes information indicating a position of the maximum L1-RSRP in the measurement result. This is because that reported resource indicators are ranked based on L1-RSRQs or L1-SINRs. Therefore, an L1-RSRP of a pair of beams corresponding to a resource indicator with the maximum L1-RSRQ or L1-SINR may not necessarily be the maximum. That is, the L1-RSRP as the reference is not necessarily the first L1-RSRP. Therefore, additional information is required to indicate the position of the L1-RSRP as the reference in the measurement result.

FIG. 7 shows another schematic example of the measurement result reported in the case that the reference signal is CSI-RS. In FIG. 7, the CSI field includes the reported CRI #1 to CRI #4 and quantized values of RSRPs respectively corresponding to the CRI #1 to CRI #4. The CSI field further includes 2 or less bits indicating the position of the maximum L1-RSRP. In this example, a pair of beams corresponding to CRI #2 has the maximum L1-RSRP. Therefore, the above 2 bits are used to indicate position 2, for example. It can be understood that when there are fewer CRIs reported, fewer bits may be used to indicate the position of the maximum L1-RSRP.

In addition, although not shown in FIG. 7, the CSI field may also include the RSRQ (or SINR) value shown in FIG. 6. Similarly, in the case that the reference signal is the SS/PBCH, the resource indicator is the SSBRI.

In another example, the executing unit 103 determines, based on the measured L1-RSRP, N pairs of beams of the serving cell with the maximum L1-RSRP as N pairs of beams with the best beam quality in the case of taking interferences from the neighboring cell into consideration. The reporting unit 102 reports resource indicators of resources of the reference signals corresponding to transmitting beams in the N pairs of beams to the base station as the measurement result, where N is a natural number. The measurement result further includes interference information relevant to the N pairs of beams.

For example, the measurement result further includes a quantized value of an L1-RSRP of each pair of beams among the N pairs of beams. A maximum L1-RSRP is used as a reference, and a differential value of another physical layer reference signal received power relative to the reference is used as a quantized value of the L1-RSRP of another pair of beams. FIG. 8 shows an example of quantizing the L1-RSRP. The reference signal is the CSI-RS. A quantization range of the CSI-RSRP is from −140 dBm to −44 dBm, with a step size of 1 dBm. Therefore, there are 98 quantized states in total, and each reported CSI-RSRP value may be represented by a field of 7 bits. In the case that the reference signal is the SS/PBCH, similar quantization can be performed.

Different from the prior art, the measurement result reported in this example further includes interference information relevant to the N pairs of beams. For example, the interference information may be an indication of whether the L1-RSRQ or the L1-SINR relevant to each pair of beams among the N pairs of beams is above a predetermined threshold. The indication may be appended to the quantized value of the RSRP, and may be represented by a field of 1 bit.

In addition, the interference information may be an indication of a range within which the L1-RSRQ or L1-SINR relevant to each pair of beams among the N pairs of beams falls. The number of bits required for the indication depends on the number of ranges. For example, in a case that a possible range of the L1-RSRQ or L1-SINR is divided into four ranges, the indication may be represented by a field of 2 bits. Similarly, this indication may be appended to the quantized value of the RSRP.

Alternatively, the interference information may include information indicating ranking of the N pairs of beams according to the L1-RSRQ or L1-SINR. For example, with respect to each resource indicator reported, the interference information includes a serial number corresponding to the beam corresponding to the resource indicator in a case that the N pairs of beams are ranked according to L1-RSRQs or L1-SINRs in a descending order. FIG. 9 shows another schematic example of the reported measurement result in the case that the reference signal is CSI-RS. In this example, the CSI field includes CRI #1 to CRI #4 corresponding to the first 4 pairs of beams acquired by ranking RSRPs in a descending order, and quantized values of RSRPs respectively corresponding to the four CRIs. Only the maximum RSRP is represented by an actual quantized value. Other RSRPs each is represented by a differential value relative to the maximum RSRP. The CSI field further includes 2 or less bits indicating the serial number of one of CRI #1 to CRI #4. The serial numbers are acquired by ranking the pairs of beams corresponding to CRI #1 to CRI #4 according to L1-RSRQs or L1-SINRs of the pairs of beams in a descending order.

Alternatively, the interference information may include an L1-RSRQ or L1-SINR relevant to each pair of beams among the N pairs of beams. FIG. 10 shows another schematic example of the measurement result reported in the case that the reference signal is CSI-RS. In addition to the RSRPs of CRIs, the interference information further includes RSRQs of the CRIs. A maximum RSRQ is represented by an actual quantized value. Other RSRQ is represented by a differential value relative to the maximum RSRQ. An RSRQ of a pair of beams corresponding to CRI #1 is not necessarily the maximum. Therefore, the interference information further includes information indicating a position of the maximum RSRQ. In the example shown in FIG. 10, 2 or less bits are used to indicate the position. For example, an RSRQ of a pair of beams corresponding to CRI #2 is the maximum. Similarly, the SINR may be used in place of the RSRQ. Alternatively, in the case that the reference signal is the SS/PBCH, the SSBRI is used as the resource indicator.

In another example, the executing unit 103 is further configured to determine, based on the L1-RSRQ or L1-SINR, M pairs of beams that produce the strongest or weakest interferences to the serving cell among pairs of beams formed by transmitting beams of the base station of the neighboring cell and receiving beams of the user equipment of the serving cell, and include resource indicators of resources of reference signals of the neighboring cell corresponding to transmitting beams in the M pairs of beams and an identifier of the neighboring cell in the measurement result. Alternatively, the executing unit 103 may be further configured to determine, based on an L1-RSRP with respect to a transmitting beam of the neighboring cell, M beams that produce strongest or weakest interferences to the serving cell among the transmitting beams of the neighboring cell, and include resource indicators of resources of reference signals of the neighboring cell corresponding to the M beams and an identifier of the neighboring cell in the measurement result. For example, in order to determine a maximum L1-RSRP with respect to each transmitting beam of the neighboring cell, the UE may attempt to use different receiving beams.

The measurement result can tell the base station of the serving cell when using which transmitting beams it would be subjected to the strongest interferences from the neighboring cell, or when using which transmitting beams it may avoid interferences from the neighboring cell as much as possible. In addition, the UE reports the interferences produced by a beam of the neighboring cell. Therefore, beam-level system scheduling may be performed between the neighboring cell and the serving cell. For example, when the neighboring cell uses a downlink transmitting beam that produces strong interferences to the UE, the serving cell may cause the UE to avoid using a receiving beam that receives the strong interferences from the neighboring cell as much as possible.

FIG. 11 shows another schematic example of the measurement result reported in the case that the reference signal is the CSI-RS. In this example, the CSI field includes CRIs corresponding to the M (for example, M=4) beams with the strongest interferences produced by a neighboring cell and a physical cell ID (PCI) of the corresponding neighboring cell. The CSI field further includes quantized values of RSRPs respectively corresponding to the M beams. In the case that the M (for example, M=4) beams are determined based on L1-RSRPs, a quantized value of an RSRP is a maximum RSRP that can be acquired for each of the M beams. Similarly, the maximum RSRP is represented by an actual quantized value, and other RSRP is represented by a differential value relative to the maximum RSRP. On the other hand, in the case that the M beams are determined based on L1-RSRQs or L1-SINRs, a quantized value of an RSRP is a quantized value of the RSRP of the transmitting beam of the neighboring cell received by the UE under the condition of using the corresponding M (for example, M=4) pairs of beams. Similarly, the maximum RSRP is represented by an actual quantized value, other RSRP is represented by a differential value relative to the maximum RSRP. However, in the latter case, a transmitting beam with maximum L1-RSRQ or L1-SINR may not necessarily have the maximum RSRP. Therefore, the CSI field may further include information indicating a position of the maximum RSRP, as shown in an italicized column in FIG. 11. The information indicating the position of the maximum RSRP may be presented by 2 or less bits.

FIG. 12 shows another schematic example of the measurement result reported in the case that the reference signal is the CSI-RS. Different from FIG. 11, in this example, the CSI field includes CRIs corresponding to four beams with the weakest interferences produced by the neighboring cell and a PCI of the corresponding neighboring cell. Similarly, the CRI may be selected based on L1-RSRQ or L1-SINR, or selected based on L1-RSRP. The description made with reference to FIG. 11 is similarly applied to FIG. 12 and is not repeated here.

In addition, in the case that the reference signal is the SS/PBCH, the reported resource indicator is the SSBRI. It should be understood that in the case of adopting the process P3', it is unnecessary to report the measurement result as shown in FIG. 11 or FIG. 12, since the transmitting beam of the neighboring cell is fixed.

Although many examples of the reported measurement result are described above, it should be understood that this description is not restrictive, and the measurement result may be reported in various other forms.

Figure 13:
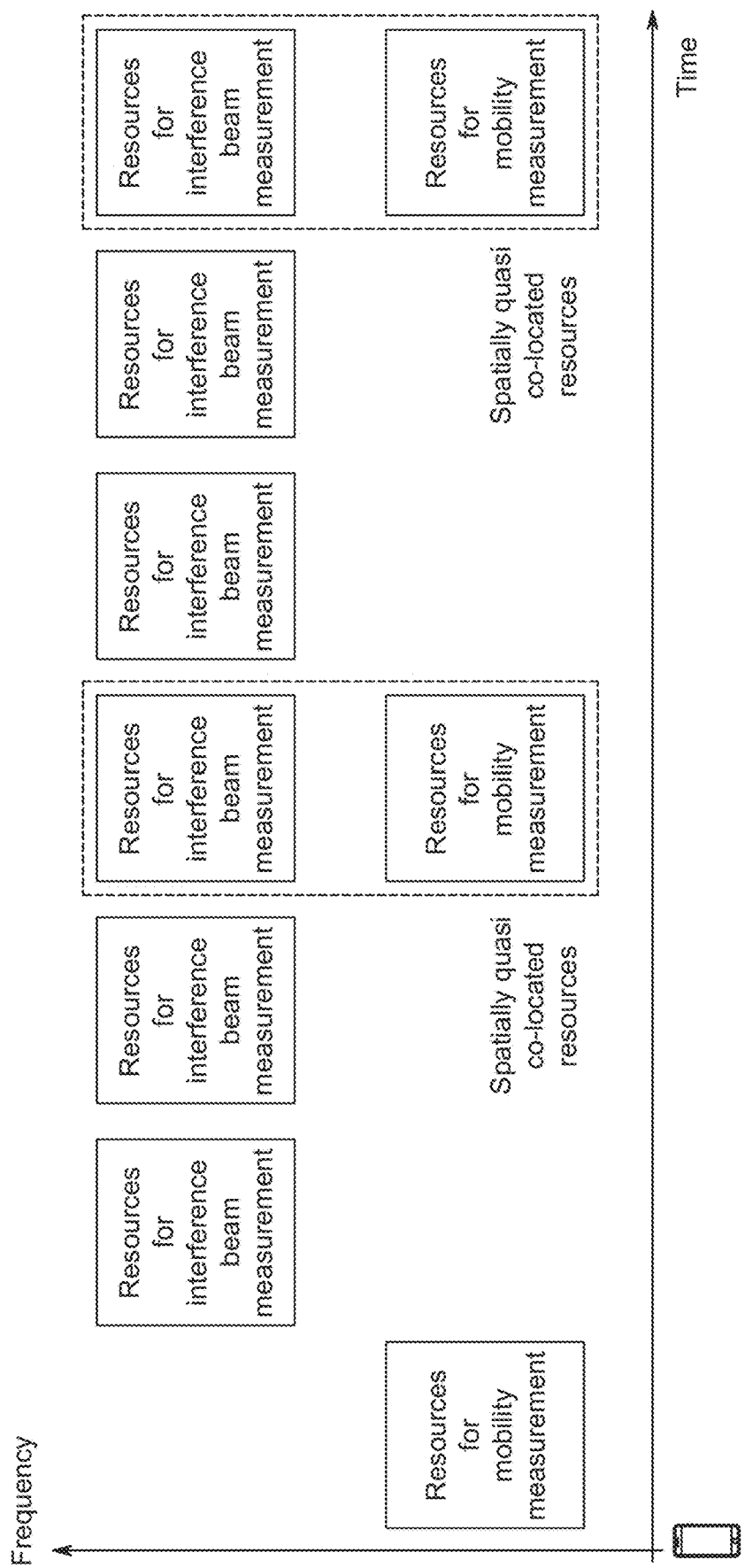
FIG. 13 is a schematic diagram showing a relationship between resources of the reference signal for beam management and resources of the reference signal for mobility management

In addition to the reference signal measurement for beam management, the UE further performs reference signal measurement for mobility management. Resources of the reference signal for mobility management have a longer period than the resources of the reference signal for beam management. If the two kinds of resources are spatially quasi co-located (QCLed), the UE may measure the two kinds of resources at some time instants, to acquire a more accurate result, which is called joint measurement. FIG. 13 is a schematic diagram showing a relationship between resources of the reference signal for beam management and resources of the reference signal for mobility management. It can be seen that in a dashed line block, the resources of the reference signal for mobility management and the resources of the reference signal for beam management are spatially quasi co-located. The UE may measure the two kinds of resources, and report a measurement result according to the present disclosure.

Accordingly, the reporting unit 102 may be configured to report information indicating whether to support joint measurement to the base station. As described above, in the joint measurement, resources of the reference signal for the interference beam measurement and resources for the mobility measurement spatially quasi co-located with the resources of the reference signal for the interference beam measurement are simultaneously measured.

In summary, the electronic apparatus 100 according to the present embodiment measures the degree of interferences produced by the transmitting beam of the neighboring cell to the serving cell by executing the interference beam measurement, so that beam quality of each beam of the serving cell can be more accurately evaluated in the case of taking interferences from the neighboring cell into consideration, thereby achieving more efficient beam management.

Second Embodiment

Figure 14:
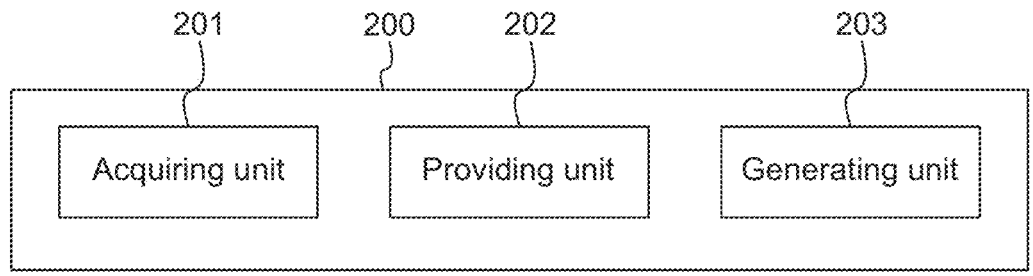
FIG. 14 is a block diagram showing functional modules of an electronic apparatus for wireless communications according to another embodiment of the present disclosure.

FIG. 14 is a block diagram showing functional modules of an electronic apparatus 200 for wireless communications according to another embodiment of the present disclosure. The electronic apparatus 200 includes an acquiring unit 201, a providing unit 202, and a generating unit 203. The acquiring unit 201 is configured to acquire an indicator of resources to be measured from user equipment of a serving cell, where the indicator of resources to be measured indicates resources of a neighboring cell for transmitting a reference signal which are desired to be used for interference beam measurement, and the interference beam measurement is used to measure a degree of interferences produced by a transmitting beam of the neighboring cell to the serving cell. The providing unit 202 is configured to provide the indicator of resources to be measured to a base station of the neighboring cell. The generating unit 203 is configured to generate configuration information for the interference beam measurement to be provided to the user equipment.

The acquiring unit 201, the providing unit 202, and the generating unit 203 may be implemented by one or more processing circuitries. The processing circuitry may be implemented as, for example, a chip. In addition, it should be understood that various functional units in the apparatus shown in FIG. 14 are logical modules divided based on functions implemented by these functional units, and are not intended to limit implementations, which is applicable to examples of other electronic apparatus described subsequently.

The electronic apparatus 200 may be arranged at a side of a base station or may be communicatively connected to a base station. The base station described in the present disclosure may be a transmit receive point (TRP) or an access point (AP). Here, it should be further pointed out that the electronic apparatus 200 may be implemented at a chip level or an apparatus level. For example, the electronic apparatus 200 may operate as the base station itself and further include external apparatus such as a memory, a transceiver and the like (which are not shown in the Figures). The memory may be configured to store programs to be executed and related data information for the base station to implement various functions. The transceiver may include one or more communication interfaces to support communications with various apparatuses (for example, user equipment, another base station and the like). Implementations of the transceiver are not limited herein, which is also applicable to examples of other electronic apparatus described subsequently.

A detailed description of the interference beam measurement may refer to the description in the first embodiment, and is not repeated here. For example, the reference signal to be used for interference beam measurement may be the SS/PBCH or CSI-RS. Accordingly, indicators of resources to be measured acquired by the acquiring unit 201 may be the SSBRI and the CRI. These indicators of resources to be measured essentially indicate directions of transmitting beams of the neighboring cell. As described in the first embodiment, these indicators of resources to be measured may be determined by the UE based on information collected at the time of initial access and/or configuration relevant to mobility, for example.

Next, the providing unit 202 may provide the indicator of resources to be measured to the base station of the neighboring cell via Xn signaling, for example. In an example, the neighboring cell provides a transmitting beam corresponding to the indicator of resources to be measured without transmitting any feedback to the base station of the serving cell.

In another example, the base station of the neighboring cell further determines, based on its resource utilization status, whether resources indicated by the indicator of resources to be measured can be provided. That is, the base station of the neighboring cell further determines whether a transmitting beam corresponding to the indicator of resources to be measured can be provided to the serving cell, and provides the determination result in a format of feedback to the base station of the serving cell. In this case, the acquiring unit 201 is further configured to acquire feedback information with respect to the indicator of resources to be measured from the base station of the neighboring cell.

The feedback information may include one of the following, for example: acknowledgement information; and a modified indicator of resources to be measured. For example, in a case that the reference signal is the CSI-RS, the base station of the neighboring cell determines whether the current CSI-RS resources are sufficient. In a case that the current CSI-RS resources are sufficient, the base station of the neighboring cell transmits acknowledgement information to the base station of the serving cell, to inform the base station of the serving cell that the base station of the neighboring cell would provide a transmitting beam based on the indicator of resources to be measured. Otherwise, the base station of the neighboring cell can determine resources that can be provided based on the current resource occupation status, and provide a modified indicator of resources to be measured to the base station of the serving cell. The feedback information may also be transmitted via Xn signaling.

Accordingly, in a case that the neighboring cell is to perform interference beam measurement, the acquiring unit 201 is further configured to receive the indicator of resources to be measured from the base station of the neighboring cell. In addition, the acquiring unit 201 may further provide feedback information with respect to the received indicator of resources to be measured to the base station of the neighboring cell.

In another aspect, in a case that base station of the neighboring cell modifies the indicator of resources to be measured, the base station of the serving cell further provides the modified indicator of resources to be measured to the UE, so that the UE can perform correct measurement. This information may be included in the configuration information to be described below.

The generating unit 203 generates configuration information for the interference beam measurement to be provided to the UE. For example, the configuration information may include one or more of the following: resources of the serving cell for the interference beam measurement; resources of the neighboring cell for transmitting the reference signal; periodicity configuration relevant to the interference beam measurement; a sweeping scheme of an interference beam; and a category of the reference signal.

The configuration information may be provided to the UE via RRC signaling, for example. Further, the configuration information may be provided via one or more pieces of RRC signaling. Each item in the configuration information is described in detail in the first embodiment, and thus is not repeated here.

The periodicity configuration relevant to the interference beam measurement includes one or more of the following: periodical measurement, aperiodic measurement, and semi-persistent measurement. The sweeping scheme of the interference beam includes one of the following: the base station of the neighboring cell sweeps the transmitting beam, and UE of the serving cell sweeps a receiving beam; the base station of the neighboring cell sweeps the transmitting beam, and UE of the serving cell fixes the receiving beam; and the base station of the neighboring cell fixes the transmitting beam, and UE of the serving cell sweeps a receiving beam, as described with reference to FIGS. 3A to 3C in the first embodiment. The base station allocates measurement resources to the UE based on these configurations.

For example, the generating unit 203 may be configured to indicate the sweeping scheme of the interference beam to the UE based on a specific parameter in the RRC signaling. The specific parameter is InterferenceMeasureRSRepetition for example. In a case that the specific parameter is set to ON, the sweeping scheme of the interference beam of the neighboring cell is that the base station of the neighboring cell fixes the transmitting beam, and user equipment of the serving cell sweeps a receiving beam. In a case that the specific parameter is set to OFF, the sweeping scheme of the interference beam of the neighboring cell is that the base station of the neighboring cell sweeps the transmitting beam, and user equipment of the serving cell fixes a receiving beam.

In addition, the acquiring unit 201 is further configured to acquire a measurement result of the interference beam measurement from the UE. For example, the measurement result includes resource indicators of N resources of the serving cell for transmitting the reference signals. Among pairs of beams used for the interference beam measurement, N pairs of beams formed by transmitting beams corresponding to the N resources and receiving beams of the user equipment have the best beam quality in a case of taking interferences from the neighboring cell into consideration, and N is a natural number. The measurement result further includes an indication of beam quality relevant to the N pairs of beams.

In an example, among the pairs of beams used for the interference beam measurement, these N pairs of beams have maximum L1-RSRQ or L1-SINR. The indication of beam quality may include a quantized value of the L1-RSRQ or L1-SINR relevant to each pair of beams among the N pairs of beams. In addition, the indication of beam quality may further include an indication of whether the L1-RSRP of each pair of beams among the N pairs of beams is above a predetermined threshold or an indication of a range within which the L1-RSRP of each pair of beams among the N pairs of beams falls.

In another example, among the pairs of beams used for the interference beam measurement, these N pairs of beams have maximum L1-RSRP, and the indication of beam quality includes interference information relevant to the N pairs of beams. For example, the interference information may include one of the following: an indication of whether the L1-RSRQ or L1-SINR relevant to each pair of beams among the N pairs of beams is above a predetermined threshold; an indication of a range within which the L1-RSRQ or L1-SINR relevant to each pair of beams among the N pairs of beams falls; and information indicating ranking of the N pairs of beams according to L1-RSRQ or L1-SINR. In addition, the indication of beam quality may further include quantized values of L1-RSRPs corresponding to the N pairs of beams.

In yet another example, the measurement result may include resource indicators of resources of the reference signals corresponding to M transmitting beams of the neighboring cell producing the strongest or weakest interferences to the serving cell and an identifier of the neighboring cell.

Forms and content of the measurement result described above may be used in combination, which are described in detail in the first embodiment with reference to FIGS. 5 to 13, and are not repeated here.

In addition, the acquiring unit 201 is further configured to acquire information indicating whether to support joint measurement information. In the joint measurement, resources of the reference signal for the interference beam measurement and resources for the mobility measurement spatially quasi co-located with the resources of the reference signal for the interference beam measurement are simultaneously measured. Through the joint measurement, accuracy of the interference beam measurement can be improved.

In summary, the electronic apparatus 200 according to the present embodiment can acquire knowledge of the degree of interferences of the transmitting beam of the neighboring cell to the serving cell through interference beam measurement performed by the UE, so that beam quality of each beam of the serving cell can be more accurately evaluated in the case of taking interferences from the neighboring cell into consideration, thereby achieving more efficient beam management.

Third Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 15:
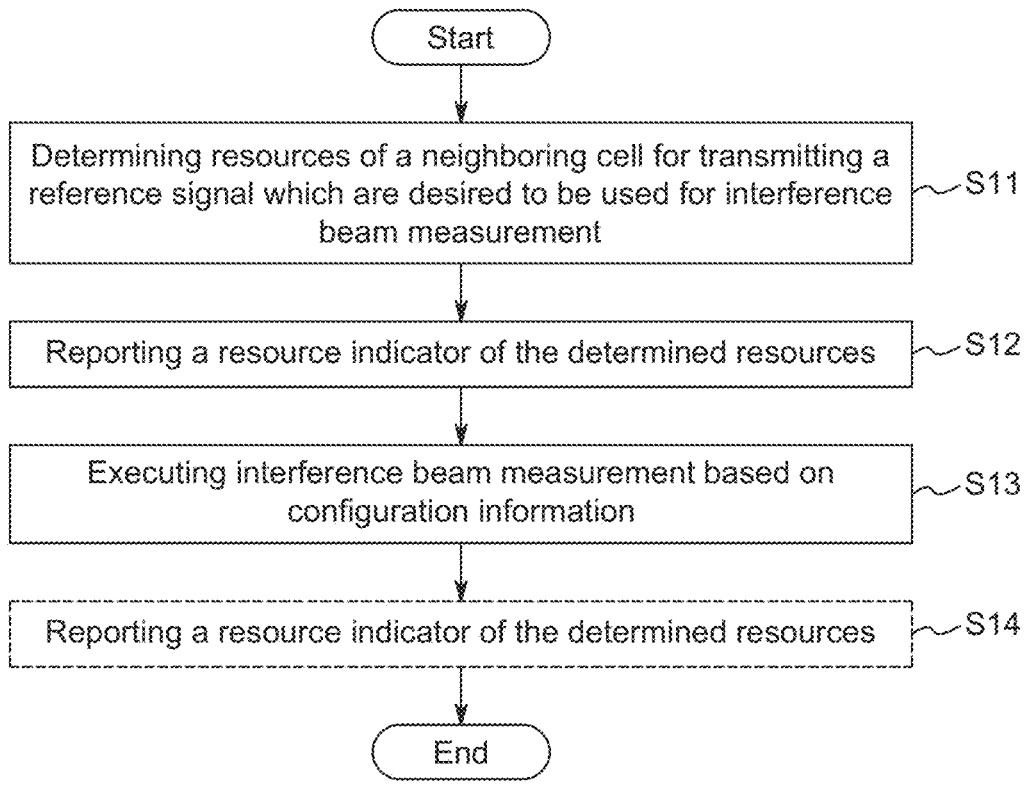
FIG. 15 is a flowchart of a method for wireless communications according to an embodiment of the present disclosure.

FIG. 15 is a flowchart of a method for wireless communications according to an embodiment of the present disclosure. The method includes: determining resources of a neighboring cell for transmitting a reference signal which are desired to be used for interference beam measurement (S11), where the interference beam measurement is used to measure a degree of interferences produced by a transmitting beam of the neighboring cell to a serving cell; reporting a resource indicator of the determined resources to a base station of the serving cell (S12); and executing the interference beam measurement based on configuration information from the base station (S13). The method may be performed for example at a side of UE.

For example, in step S11, the resources may be determined based on information collected at the time of initial access and/or configuration relevant to mobility.

In step S13, the configuration information is received via RRC signaling. Exemplarily, the configuration information may include one or more of the following: resources of the serving cell for the interference beam measurement; resources of the neighboring cell for transmitting the reference signal; periodicity configuration relevant to the interference beam measurement; a sweeping scheme of an interference beam; and a category of the reference signal. The periodicity configuration relevant to the interference beam measurement includes one or more of the following: periodical measurement, aperiodic measurement, and semi-persistent measurement. The sweeping scheme of the interference beam may include one of the following: the base station of the neighboring cell sweeps the transmitting beam, and UE of the serving cell sweeps a receiving beam; the base station of the neighboring cell sweeps the transmitting beam, and UE of the serving cell fixes the receiving beam; and the base station of the neighboring cell fixes the transmitting beam, and UE of the serving cell sweeps the receiving beam.

The reference signal may be a synchronization signal, and the resource indicator is an SSBRI, where the base station of the neighboring cell sweeps the transmitting beam, and the user equipment of the serving cell sweeps a receiving beam. The reference signal may also be a CSI-RS, and the resource indicator is a CRI. In step S13, the sweeping scheme of the interference beam may be determined based on a specific parameter in RRC. The specific parameter may be, for example, InterferenceMeasureRSRepetition. In a case that the specific parameter is set to ON, the sweeping scheme of the interference beam is that the base station of the neighboring cell fixes the transmitting beam, and user equipment of the serving cell sweeps a receiving beam. In a case that the specific parameter is set to OFF, the sweeping scheme of the interference beam is that the base station of the neighboring cell sweeps the transmitting beam, and user equipment of the serving cell fixes the receiving beam.

In step S13, the interference beam measurement may be performed as follows: with respect to each pair of beams of the serving cell for transceiving the reference signal, an L1-RSRP is measured; with respect to each pair of beams formed by the transmitting beam of the base station of the neighboring cell and a receiving beam of the user equipment of the serving cell, which is used for the interference beam measurement, an L1-RSSI or a sum of interferences and noise on resources elements carrying the reference signal is measured; and calculating, based on the measured L1-RSRP and L1-RSSI, L1-RSRQ of each pair of beams of the serving cell in a case of taking interferences from the neighboring cell into consideration, or calculating, based on the measured L1-RSRP and the sum of the interferences and noise, an L1-SINR of each pair of beams of the serving cell in a case of taking the interferences from the neighboring cell into consideration.

As shown in a dashed line block in FIG. 15, the above method may further include a step S14 of reporting a measurement result of the interference beam measurement to the base station.

In an example, the step S13 further includes: determining, based on the calculated L1-RSRQ or L1-SINR, N pairs of beams of a serving cell with maximum L1-RSRQ or L1-SINR as N pairs of beams with the best beam quality in the case of taking interferences from the neighboring cell into consideration, where N is a natural number. In step S14, resource indicators of resources of the reference signals corresponding to transmitting beams in the N pairs of beams are reported to the base station as the measurement result.

The measurement result may further include an indication of beam quality relevant to the N pairs of beams. For example, the indication of beam quality includes a quantized value of the L1-RSRQ or L1-SINR relevant to each pair of beams among the N pairs of beams. A maximum L1-RSRQ or L1-SINR may be taken as a reference, and a differential value of an L1-RSRQ or L1-SINR relevant to another pair of beams among the N pairs of beams relative to the reference is used as an indication of the beam quality of the another pair of beams.

The indication of beam quality may further include an indication of whether the L1-RSRP of each pair of beams among the N pairs of beams is above a predetermined threshold or an indication of a range within which the L1-RSRP of each pair of beams among the N pairs of beams falls.

The indication of beam quality may include a quantized value of the L1-RSRP of each pair of beams among the N pairs of beams. A maximum L1-RSRP is taken as a reference, and a differential value of another L1-RSRP relative to the reference is used as a quantized value of the L1-RSRP of another pair of beams. The indication of beam quality further includes information indicating a position of the maximum L1-RSRP in the measurement result.

In another example, the step S13 further includes: determining, based on the measured L1-RSRP, the N pairs of beams of the serving cell with the maximum L1-RSRP as N pairs of beams with the best beam quality in the case of taking interferences from the neighboring cell into consideration, and reporting resource indicators of resources of the reference signals corresponding to transmitting beams in the N pairs of beams to the base station as the measurement result, where N is a natural number. The measurement result further includes interference information relevant to the N pairs of beams.

The measurement result may further include the quantized value of an L1-RSRP relevant to each pair of beams among the N pairs of beams. A maximum L1-RSRP is taken as a reference, and a differential value of another L1-RSRP relative to the reference is used as a quantized value of the L1-RSRP of another pair of beams.

The interference information may include, for example, one of the following: an indication of whether the L1-RSRQ or L1-SINR relevant to each pair of beams among the N pairs of beams is above a predetermined threshold; an indication of a range within which the L1-RSRQ or L1-SINR relevant to each pair of beams among the N pairs of beams falls; and information indicating ranking of the N pairs of beams according to the L1-RSRQ or L1-SINR.

In another example, step S13 may further include: determining, based on the calculated L1-RSRQ or L1-SINR, M pairs of beams that produce the strongest or weakest interferences to the serving cell among pairs of beams formed by transmitting beams of the base station of the neighboring cell and receiving beams of the user equipment of the serving cell. In step S14, resource indicators of resources of reference signals of the neighboring cell corresponding to transmitting beams in the M pairs of beams and an identifier of the neighboring cell are included in the measurement result.

In addition, although not shown in the Figure, the above method may further include the following step: reporting information indicating whether to support joint measurement to the base station. In the joint measurement, resources of the reference signal for the interference beam measurement and resources for the mobility measurement spatially quasi co-located with the resources of the reference signal for the interference beam measurement are simultaneously measured.

Figure 16:
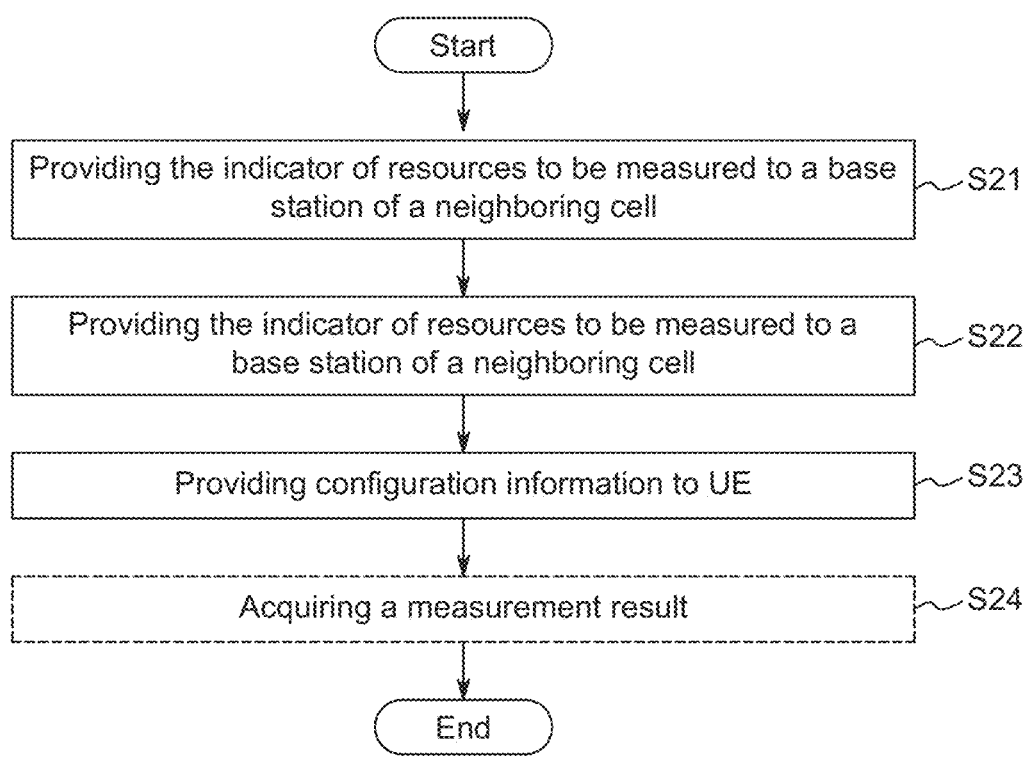
FIG. 16 is a flowchart of a method for wireless communications according to another embodiment of the present disclosure.

FIG. 16 is a flowchart of a method for wireless communications according to another embodiment of the present disclosure. The method includes: acquiring an indicator of resources to be measured from user equipment of a serving cell, where the indicator of resources to be measured indicates resources of a neighboring cell for transmitting a reference signal which are desired to be used for interference beam measurement, and the interference beam measurement is used to measure a degree of interferences produced by a transmitting beam of the neighboring cell to the serving cell (S21); providing the indicator of resources to be measured to a base station of the neighboring cell (S22); and generating configuration information for the interference beam measurement to be provided to the user equipment (S23). The method may be implemented, for example, at a side of a base station.

The reference signal may be a CSI-RS or SS/PBCH. In step S22, the indicator of resources to be measured is provided to the base station of the neighboring cell via Xn signaling. In step S22, feedback information with respect to the indicator of resources to be measured may be acquired from the base station of the neighboring cell. The feedback information includes one of the following: acknowledgement information; and a modified indicator of resources to be measured.

A definition of the configuration information may refer to the description in the first embodiment, and is not repeated here. The configuration information may be provided to the UE via RRC signaling.

As shown in a dashed line block in FIG. 16, the above method may further include a step S24 of acquiring the measurement result of the interference beam measurement from the UE. The measurement result includes, for example, resource indicators of N resources of the serving cell for transmitting the reference signals. Among pairs of beams used for the interference beam measurement, N pairs of beams formed by transmitting beams corresponding to the N resources and receiving beams of the user equipment have the best beam quality in a case of taking interferences from the neighboring cell into consideration, and N is a natural number. The measurement result further includes an indication of beam quality relevant to the N pairs of beams. The indication of beam quality may include a quantized value of an L1-RSRQ or L1-SINR relevant to each pair of beams among the N pairs of beams. The indication of beam quality may further include an indication of whether the L1-RSRP of each pair of beams among the N pairs of beams is above a predetermined threshold or an indication of a range within which the L1-RSRP of each pair of beams among the N pairs of beams falls.

In addition, although not shown in FIG. 16, the above method may further include the following step: receiving an indicator of resources to be measured from the base station of the neighboring cell, and providing feedback information with respect to the indicator of resources to be measured to the base station of the neighboring cell.

It should be noted that the above methods may be used separately or in combination. Details thereof are described in the first embodiment and the second embodiment, and are not repeated here.

The technology according to the present disclosure is applicable to various products.

For example, the electronic apparatus 200 may be implemented as various base stations. The base station may be implemented as any type of evolved node B (eNB) or gNB (a 5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include: a main body (also referred to as a base station apparatus) configured to control wireless communication; and one or more remote radio head ends (RRH) located at positions different from the main body. In addition, various types of user equipments may each serve as a base station by performing functions of the base station temporarily or semi-permanently.

The electronic apparatus 100 may be implemented as various user equipments. The user equipment may be implemented as a mobile terminal (such as a smartphone, a tablet personal computer (PC), a notebook PC, a portable game terminal, a portable/dongle-type mobile router, and a digital camera device) or an in-vehicle terminal such as a car navigation apparatus. The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) mounted on each of the terminals described above.

[Application Example Regarding a Base Station]

First Application Example

Figure 17:
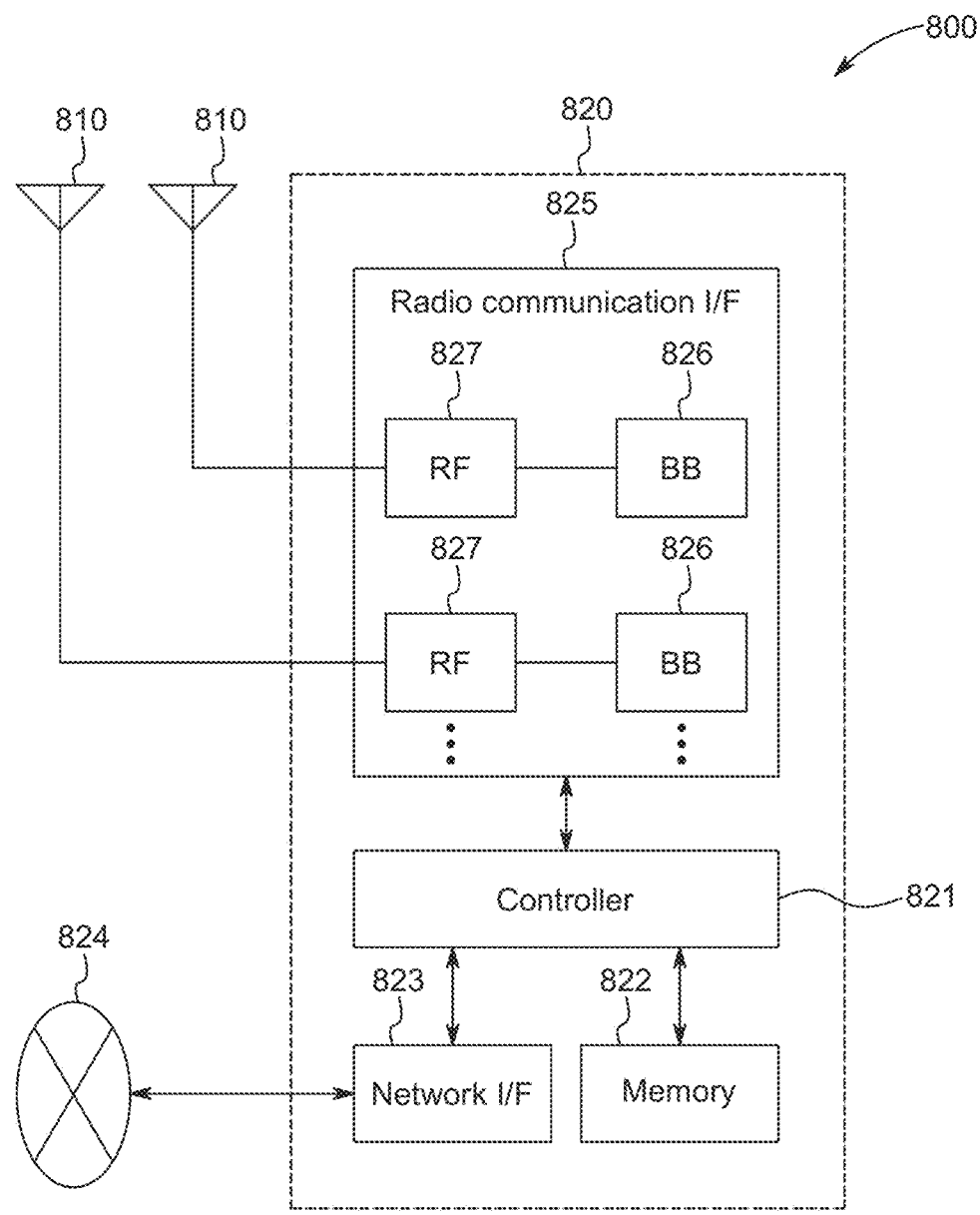
FIG. 17 is a block diagram showing a first example of an exemplary configuration of an eNB or gNB to which the technology according to the present disclosure may be applied.

FIG. 17 is a block diagram showing a first example of an exemplary configuration of an eNB or gNB to which technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 17, the eNB 800 may include the multiple antennas 810. For example, the multiple antennas 810 may be compatible with multiple frequency bands used by the eNB 800. Although FIG. 17 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 17, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 17. For example, the multiple RF circuits 827 may be compatible with multiple antenna elements. Although FIG. 17 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 17, a transceiver of the electronic apparatus 200 may be implemented by the radio communication interface 825. At least a part of functions may also be implemented by the controller 821. For example, the controller 821 may configure the interference beam measurement performed by the UE and acquire the result of the interference beam measurement by performing functions of the acquiring unit 201, the providing unit 202, and the generating unit 203.

Second Application Example

Figure 18:
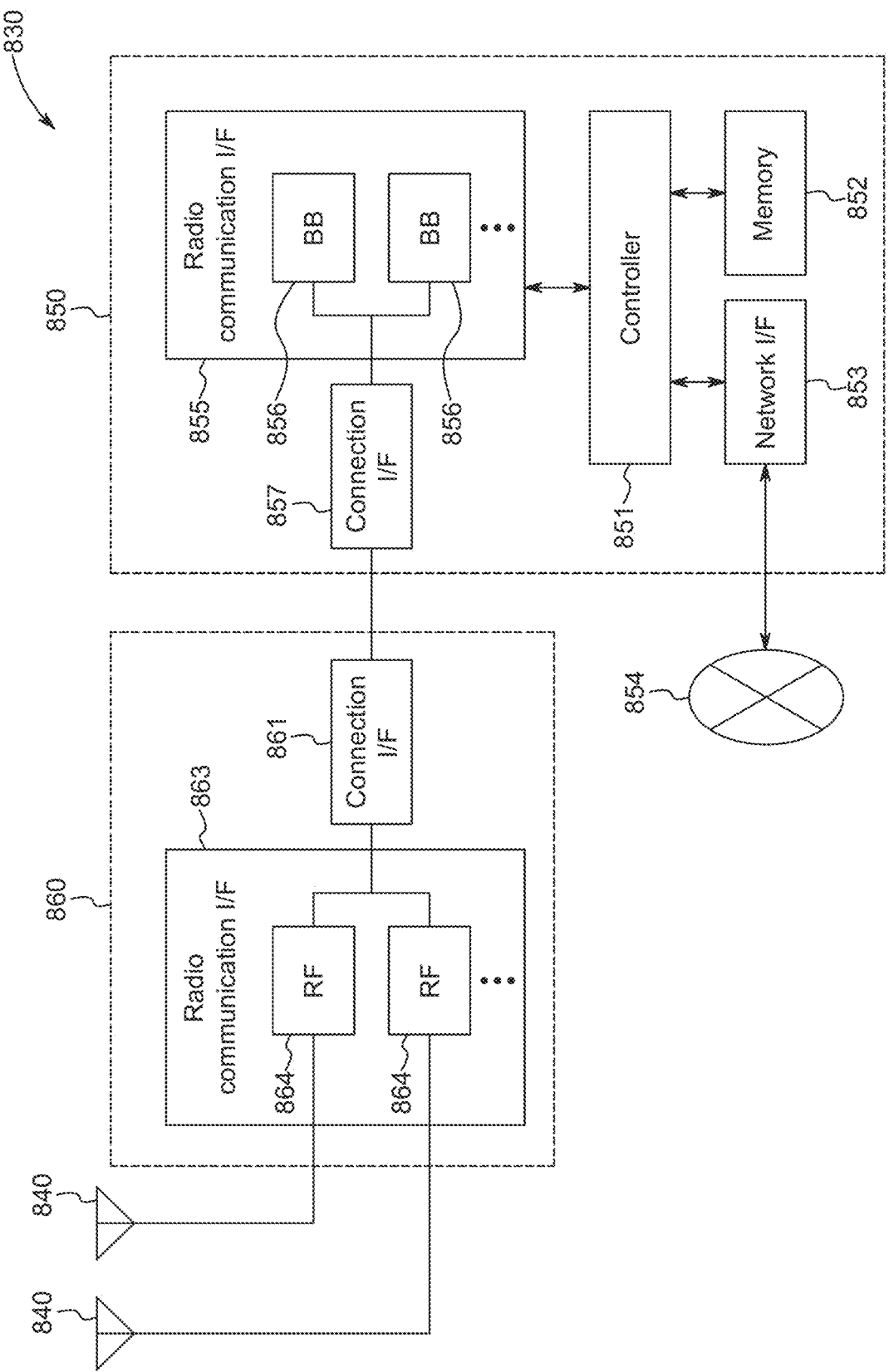
FIG. 18 is a block diagram showing a second example of an exemplary configuration of the eNB or gNB to which the technology according to the present disclosure may be applied.

FIG. 18 is a block diagram showing a second example of the exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860.

The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 18, the eNB 830 may include the multiple antennas 840. For example, the multiple antennas 840 may be compatible with multiple frequency bands used by the eNB 830. Although FIG. 18 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 17.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 17, except that the BB processor 856 is connected to an RF circuit 864 of the RRH 860 via the connection interface 857. As show in FIG. 18, the radio communication interface 855 may include the multiple BB processors 856. For example, the multiple BB processors 856 may be compatible with multiple frequency bands used by the eNB 830. Although FIG. 18 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 18. For example, the multiple RF circuits 864 may support multiple antenna elements. Although FIG. 18 shows the example in which the radio communication interface 863 includes the multiple RF circuits 864, the radio communication interface 863 may also include a single RF circuit 864.

In the eNB 830 shown in FIG. 18, a transceiver of the electronic apparatus 200 may be implemented by the radio communication interface 855 and/or the radio communication interface 863. At least a part of functions may also be implemented by the controller 851. For example, the controller 851 may configure the interference beam measurement performed by the UE and acquire the result of the interference beam measurement by performing functions of the acquiring unit 201, the providing unit 202, and the generating unit 203.

<Application Example for User Equipment>

First Application Example

Figure 19:
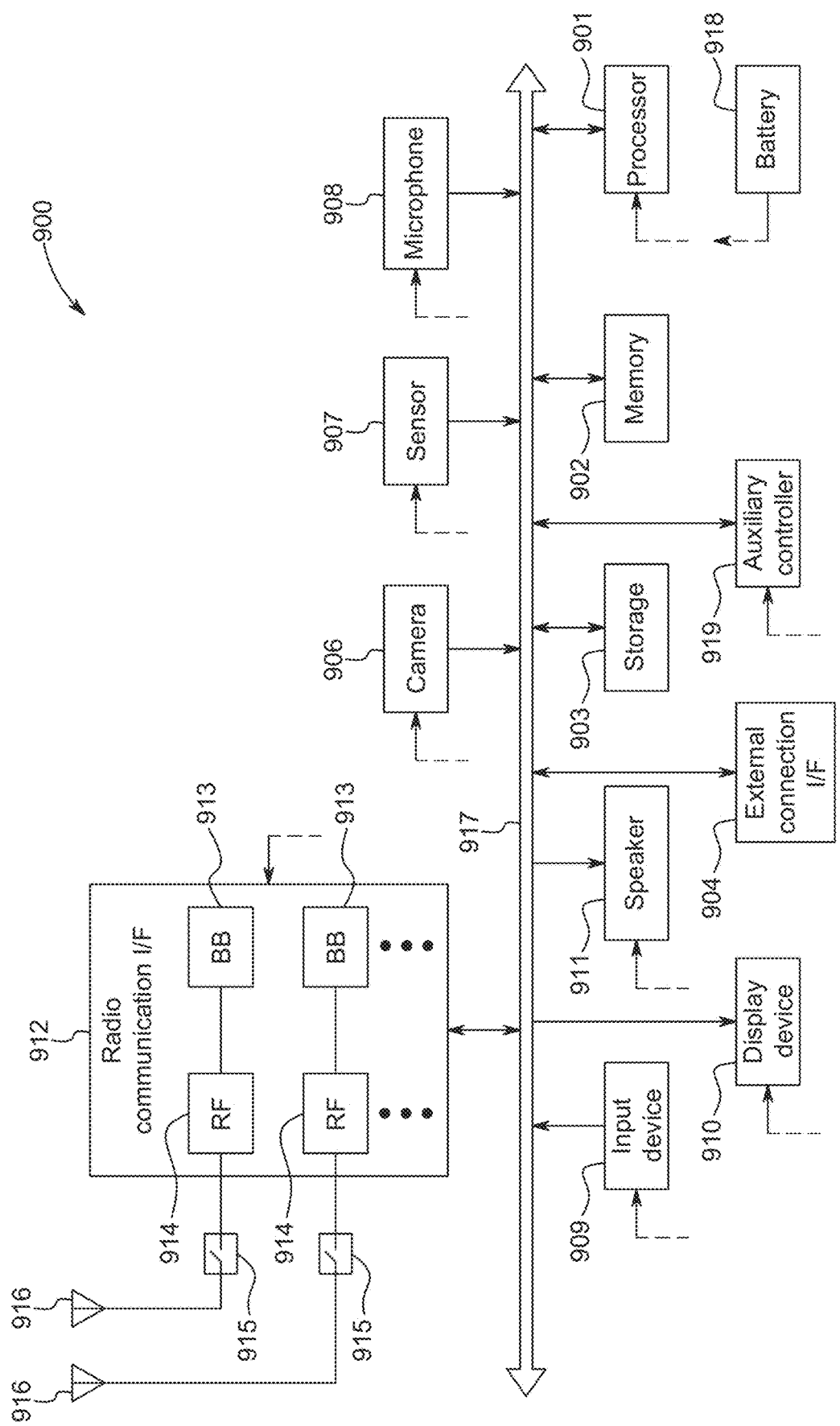
FIG. 19 is a block diagram showing an example of an exemplary configuration of a smartphone to which the technology according to the present disclosure may be applied.

FIG. 19 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 19 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 19. Although FIG. 19 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 19. Although FIG. 19 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 19 via feeder lines that are partially shown as dashed lines in FIG. 19. The auxiliary controller 919, operates a minimum necessary function of the smart phone 900, for example, in a sleep mode.

In the smartphone 900 shown in FIG. 19, a transceiver of the electronic apparatus 100 may be implemented by the radio communication interface 912. At least a part of functions may also be implemented by the processor 901 or the auxiliary controller 919. For example, the processor 901 or the auxiliary controller 919 may perform the interference beam measurement for the neighboring cell and report the measurement result by performing the functions of the determining unit 101, the reporting unit 102, and the executing unit 103.

Second Application Example

Figure 20:
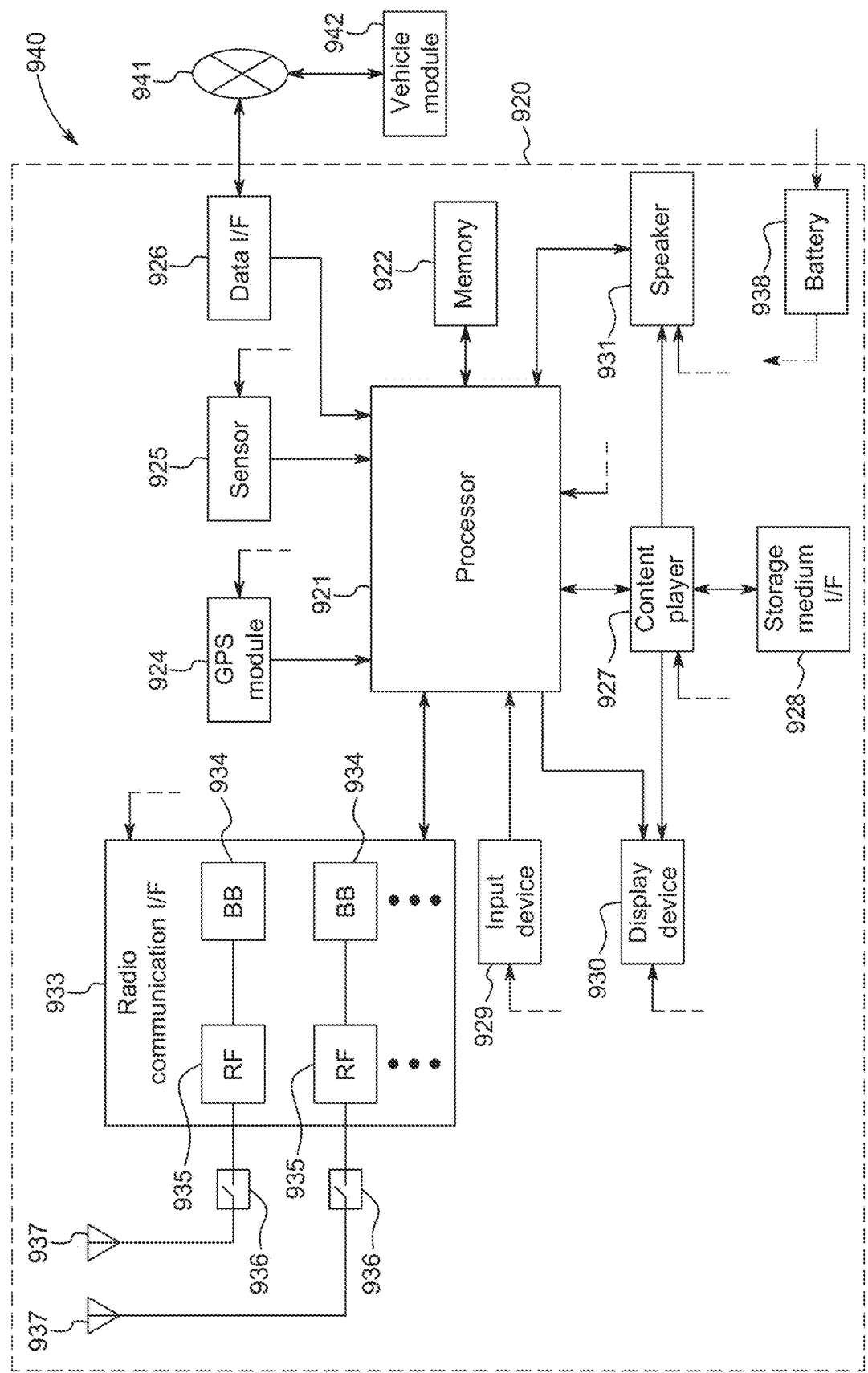
FIG. 20 is a block diagram showing an example of an exemplary configuration of a car navigation apparatus to which the technology according to the present disclosure may be applied.

FIG. 20 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sound for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 20. Although FIG. 20 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 20, the car navigation apparatus 920 may include the multiple antennas 937.

Although FIG. 20 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 20 via feeder lines that are partially shown as dash lines in FIG. 20. The battery 938 accumulates power supplied from the vehicle.

In the car navigation apparatus 920 shown in FIG. 20, a transceiver of the electronic apparatus 100 may be implemented by the radio communication interface 933. At least a part of the functions may also be implemented by the processor 921. For example, the processor 921 may perform the interference beam measurement for the neighboring cell and report the measurement result by performing the functions of the determining unit 101, the reporting unit 102, and the executing unit 103.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2100 shown in FIG. 21) from a storage medium or network, wherein the computer is capable of implementing various functions when installed with various programs.

Figure 21:
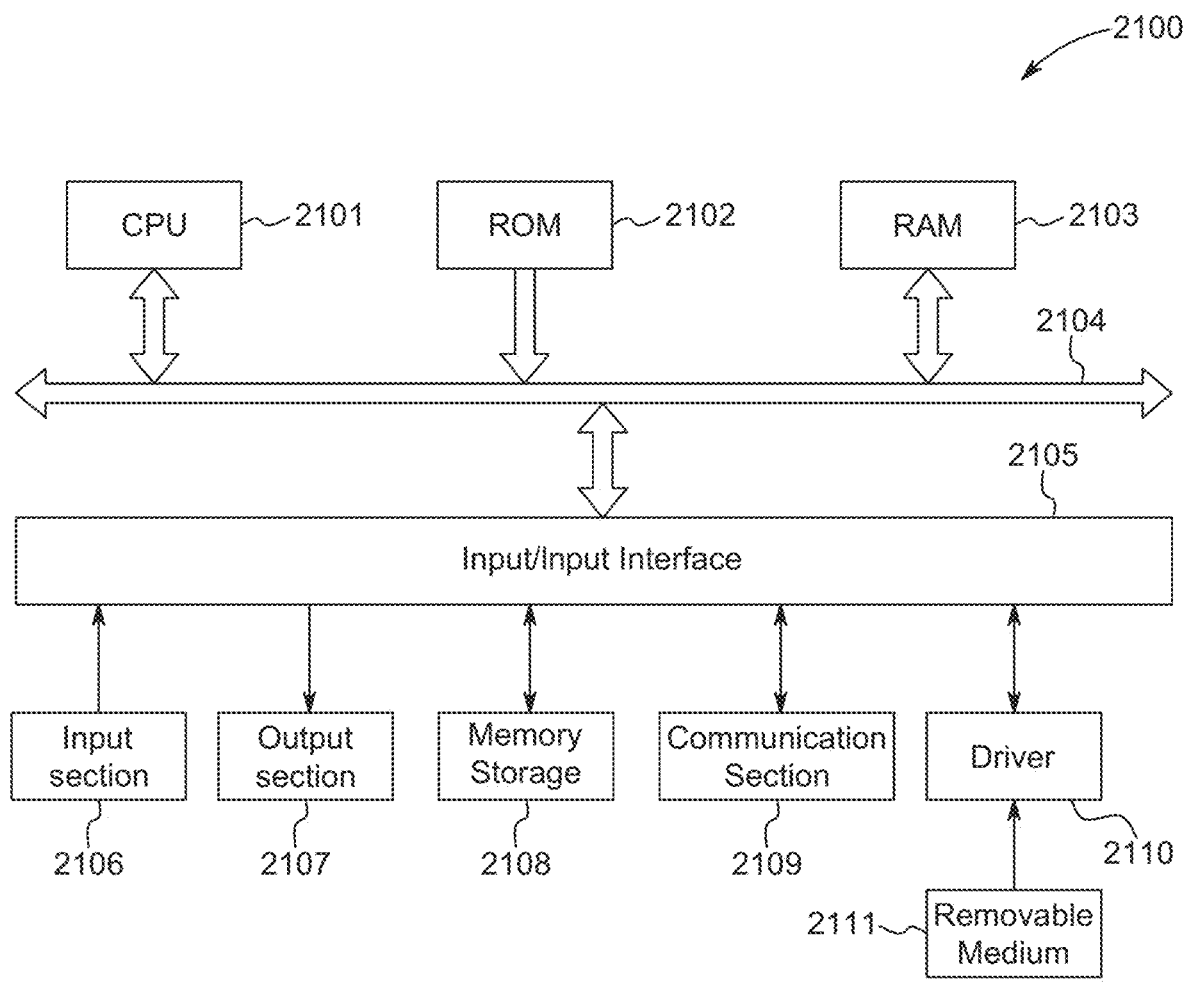
FIG. 21 is a block diagram of an exemplary block diagram illustrating the structure of a general purpose personal computer capable of realizing the method and/or device and/or system according to the embodiments of the present disclosure.

In FIG. 21, a central processing unit (CPU) 2101 executes various processing according to a program stored in a read-only memory (ROM) 2102 or a program loaded to a random access memory (RAM) 2103 from a memory section 2108. The data needed for the various processing of the CPU 2101 may be stored in the RAM 2103 as needed. The CPU 2101, the ROM 2102 and the RAM 2103 are linked with each other via a bus 2104. An input/output interface 2105 is also linked to the bus 2104.

The following components are linked to the input/output interface 2105: an input section 2106 (including keyboard, mouse and the like), an output section 2107 (including displays such as a cathode ray tube (CRT), a liquid crystal display (LCD), a loudspeaker and the like), a memory section 2108 (including hard disc and the like), and a communication section 2109 (including a network interface card such as a LAN card, modem and the like). The communication section 2109 performs communication processing via a network such as the Internet. A driver 2110 may also be linked to the input/output interface 2105, if needed. If needed, a removable medium 2111, for example, a magnetic disc, an optical disc, a magnetic optical disc, a semiconductor memory and the like, may be installed in the driver 2110, so that the computer program read therefrom is installed in the memory section 2108 as appropriate.

In the case where the foregoing series of processing is achieved through software, programs forming the software are installed from a network such as the Internet or a memory medium such as the removable medium 2111.

It should be appreciated by those skilled in the art that the memory medium is not limited to the removable medium 2111 shown in FIG. 21, which has program stored therein and is distributed separately from the apparatus so as to provide the programs to users. The removable medium 2111 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2102 and the memory section 2108 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:

processing circuitry, configured to:
receive downlink control information (DCI) that dynamically triggers an interference beam measurement for measuring a degree of interferences produced by a transmitting beam of a neighboring cell to a serving cell;
determine resources of the neighboring cell for transmitting a reference signal which are desired to be used for the interference beam measurement,
report a resource indicator of the determined resources to a base station of the serving cell;
execute the interference beam measurement based on configuration information from the base station; and
report a measurement result of the interference beam measurement to the base station of the serving cell.

2. The electronic apparatus according to claim 1, wherein the processing circuitry is configured to determine the resources based on information collected at the time of initial access and/or configuration relevant to mobility.

3. The electronic apparatus according to claim 1, wherein the configuration information comprises one or more of the following: resources of the serving cell for the interference beam measurement; resources of the neighboring cell for transmitting the reference signal; periodicity configuration relevant to the interference beam measurement; a sweeping scheme of an interference beam; and a category of the reference signal,
wherein the periodicity configuration relevant to the interference beam measurement comprises one or more of the following: periodical measurement, aperiodic measurement, and semi-persistent measurement,
wherein the sweeping scheme of the interference beam comprises one of the following: a base station of the neighboring cell sweeps the transmitting beam, and user equipment of the serving cell sweeps a receiving beam; the base station of the neighboring cell sweeps the transmitting beam, and user equipment of the serving cell fixes the receiving beam; and the base station of the neighboring cell fixes the transmitting beam, and user equipment of the serving cell sweeps a receiving beam.

4. The electronic apparatus according to claim 1, wherein the reference signal is a synchronization signal, and the resource indicator is a synchronization signal block resource indicator, wherein a base station of the neighboring cell sweeps the transmitting beam, and user equipment of the serving cell sweeps a receiving beam; or
wherein the reference signal is a channel state information reference signal, and the resource indicator is a channel state information reference signal resource indicator.

5. The electronic apparatus according to claim 4, wherein the processing circuitry is configured to determine a sweeping scheme of the interference beam based on a specific parameter in radio resource control signaling.

6. The electronic apparatus according to claim 1, wherein the processing circuitry is further configured to report a measurement result of the interference beam measurement to the base station,
wherein the processing circuitry is configured to:
with respect to each pair of beams of the serving cell for transceiving the reference signal, measure a physical layer reference signal received power;
with respect to each pair of beams formed by the transmitting beam of the base station of the neighboring cell and a receiving beam of the user equipment of the serving cell, which is used for the interference beam measurement, measure a physical layer received signal strength indication, or measure a sum of interferences and noise on resources elements carrying the reference signal; and
calculate, based on the measured physical layer reference signal received power and the physical layer received signal strength indication, physical layer reference signal receiving quality of each pair of beams of the serving cell in a case of taking interferences from the neighboring cell into consideration, or calculate, based on the measured physical layer reference signal received power and the sum of the interferences and noise, a physical layer signal to interference and noise ratio of each pair of beams of the serving cell in a case of taking the interferences from the neighboring cell into consideration.

7. The electronic apparatus according to claim 6, wherein the processing circuitry is configured to determine, based on the calculated physical layer reference signal receiving quality or physical layer signal to interference and noise ratio, N pairs of beams of the serving cell with maximum physical layer reference signal receiving quality or physical layer signal to interference and noise ratio, as N pairs of beams with best beam quality in the case of taking interferences from the neighboring cell into consideration, and report resource indicators of resources of the reference signals corresponding to the transmitting beams in the N pairs of beams to the base station as the measurement result, wherein N is a natural number.

8. The electronic apparatus according to claim 7, wherein the measurement result comprises an indication of beam quality relevant to the N pairs of beams.

9. The electronic apparatus according to claim 8, wherein the indication of beam quality comprises a quantized value of physical layer reference signal receiving quality or a physical layer signal to interference and noise ratio relevant to each pair of beams among the N pairs of beams,
wherein the processing circuitry is further configured to use, by taking the maximum physical layer reference signal receiving quality or physical layer signal to interference and noise ratio as a reference, a differential value of physical layer reference signal receiving quality or a physical layer signal to interference and noise ratio relevant to another pair of beams among the N pairs of beams relative to the reference as an indication of the beam quality of the other pair of beams; or
wherein the indication of beam quality comprises a quantized value of the physical layer reference signal received power of each pair of beams among the N pairs of beams, wherein the processing circuitry is configured to use, by taking maximum physical layer reference signal received power as a reference, a differential value of another physical layer reference signal received power relative to the reference as a quantized value of the physical layer reference signal received power of another pair of beams, and the indication of beam quality further comprises information indicating a position of the maximum physical layer reference signal received power in the measurement result.

10. The electronic apparatus according to claim 6, wherein the processing circuitry is configured to determine, based on the measured physical layer reference signal received power, the N pairs of beams of the serving cell with the maximum physical layer reference signal received power as N pairs of beams with the best beam quality in the case of taking interferences from the neighboring cell into consideration, and report resource indicators of resources of the reference signals corresponding to transmitting beams in the N pairs of beams to the base station as the measurement result, wherein N is a natural number, and the measurement result further comprises interference information relevant to the N pairs of beams.

11. The electronic apparatus according to claim 10, wherein the measurement result further comprises a quantized value of the physical layer reference signal received power of each pair of beams among the N pairs of beams, wherein the processing circuitry is configured to use, by taking maximum physical layer reference signal received power as a reference, a differential value of another physical layer reference signal received power relative to the reference as a quantized value of the physical layer reference signal received power of another pair of beams.

12. The electronic apparatus according to claim 11, wherein the interference information comprises one of the following: an indication of whether the physical layer reference signal receiving quality or physical layer signal to interference and noise ratio relevant to each pair of beams among the N pairs of beams is above a predetermined threshold; and an indication of a range within which the physical layer reference signal receiving quality or physical layer signal to interference and noise ratio relevant to each pair of beams among the N pairs of beams falls; or
wherein the interference information comprises information of ranking of the N pairs of beams according to the physical layer reference signal receiving quality or physical layer signal to interference and noise ratio.

13. The electronic apparatus according to claim 6, wherein the processing circuitry is further configured to determine, based on the calculated physical layer reference signal receiving quality or physical layer signal to interference and noise ratio, M pairs of beams that produce strongest or weakest interferences to the serving cell among pairs of beams formed by transmitting beams of the base station of the neighboring cell and receiving beams of the user equipment of the serving cell, and comprise resource indicators of resources of reference signals of the neighboring cells corresponding to transmitting beams in the M pairs of beams and identifiers of the neighboring cells in the measurement result.

14. The electronic apparatus according to claim 1,
wherein the processing circuitry is further configured to report information indicating whether to support joint measurement to the base station,
wherein in the joint measurement, resources of the reference signals for the interference beam measurement and resources for mobility measurement spatially quasi co-located with the resources of the reference signal for the interference beam measurement are simultaneously measured.

15. A method for wireless communications performed by an electronic apparatus, the method comprising:
receiving downlink control information (DCI) that dynamically triggers an interference beam measurement for measuring a degree of interferences produced by a transmitting beam of a neighboring cell to a serving cell;
determining resources of the neighboring cell for transmitting a reference signal which are desired to be used for the interference beam measurement,
reporting a resource indicator of the determined resources to a base station of the serving cell;
executing the interference beam measurement based on configuration information from the base station of the serving cell; and
reporting a measurement result of the interference beam measurement to the base station of the serving cell.

16. The method according to claim 15, further comprising:
generating the measurement result by:
with respect to each pair of beams of the serving cell for transceiving the reference signal, measuring a physical layer reference signal received power (PLRSRP); and
with respect to each pair of beams formed by the transmitting beam of the base station of the neighboring cell and a receiving beam of a user equipment of the serving cell, which is used for the interference beam measurement:
measuring a physical layer received signal strength indication (PLRSSI), and calculating, based on the measured PLRSRP and the PLRSSI, a physical layer reference signal receiving quality (PLRSRQ) of each pair of beams of the serving cell in a case of taking interferences from the neighboring cell into consideration, or
measuring a sum of interferences and noise on resources elements carrying the reference signal; and calculating, based on the measured PLRSRP and the sum of the interferences and noise, a physical layer signal to interference and noise ratio (PLSINR) of each pair of beams of the serving cell in a case of taking the interferences from the neighboring cell into consideration.

17. A non-transitory computer product containing instructions for a method for wireless communications performed by an electronic apparatus, the method comprising:
receiving downlink control information (DCI) that dynamically triggers an interference beam measurement for measuring a degree of interferences produced by a transmitting beam of a neighboring cell to a serving cell;
determining resources of the neighboring cell for transmitting a reference signal which are desired to be used for the interference beam measurement, reporting a resource indicator of the determined resources to a base station of the serving cell;
executing the interference beam measurement based on configuration information from the base station of the serving cell; and
reporting a measurement result of the interference beam measurement to the base station of the serving cell.

18. The non-transitory computer product according to claim 17, the method further comprising:
with respect to each pair of beams of the serving cell for transceiving the reference signal, measuring a physical layer reference signal received power (PLRSRP); and
with respect to each pair of beams formed by the transmitting beam of the base station of the neighboring cell and a receiving beam of a user equipment of the serving cell, which is used for the interference beam measurement:
measuring a physical layer received signal strength indication (PLRSSI), and calculating, based on the measured PLRSRP and the PLRSSI, a physical layer reference signal receiving quality (PLRSRQ) of each pair of beams of the serving cell in a case of taking interferences from the neighboring cell into consideration, or
measuring a sum of interferences and noise on resources elements carrying the reference signal; and calculating, based on the measured PLRSRP and the sum of the interferences and noise, a physical layer signal to interference and noise ratio (PLSINR) of each pair of beams of the serving cell in a case of taking the interferences from the neighboring cell into consideration.

* * * * *